US007489255B2

(12) United States Patent  
Sonoura

(10) Patent No.: US 7,489,255 B2  
(45) Date of Patent: Feb. 10, 2009

(54) SELF-POSITION IDENTIFICATION APPARATUS AND SELF-POSITION IDENTIFICATION METHOD

(75) Inventor: Takafumi Sonoura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 487 days.

(21) Appl. No.: 11/154,570

(22) Filed: Jun. 17, 2005

(65) Prior Publication Data

US 2005/0283309 A1    Dec. 22, 2005

(30) Foreign Application Priority Data

Jun. 17, 2004  (JP)  ............ P2004-179822

(51) Int. Cl.  
*G01C 21/26* (2006.01)

(52) U.S. Cl. .............................. 340/825.49

(58) Field of Classification Search ........... 340/825.36, 340/825.49, 825.34, 572.1, 5.2; 318/568.12, 318/568.16; 700/253, 254; 901/46; 701/207, 701/209  
See application file for complete search history.

(56) References Cited

U.S. PATENT DOCUMENTS

| 3,941,483 | A | * | 3/1976 | Ferrin .................... 356/141.1 |
| 4,638,445 | A | * | 1/1987 | Mattaboni .................. 701/23 |
| 4,651,283 | A | * | 3/1987 | Sciaky et al. ............... 700/207 |
| 5,165,064 | A | * | 11/1992 | Mattaboni ............... 356/141.2 |
| 5,377,106 | A | * | 12/1994 | Drunk et al. ................ 701/25 |
| 5,940,346 | A | * | 8/1999 | Sadowsky et al. .......... 367/128 |
| 2001/0055063 | A1 | * | 12/2001 | Nagai et al. ................. 348/116 |

FOREIGN PATENT DOCUMENTS

| JP | 61-59507 | 3/1986 |
| JP | 61-132104 | 6/1986 |
| JP | 1-149114 | 6/1989 |
| JP | 1-229910 | 9/1989 |
| JP | 4-112212 | 4/1992 |
| JP | 5-14567 | 4/1993 |
| JP | 5-215847 | 8/1993 |
| JP | 5-248862 | 9/1993 |
| JP | 6-35535 | 2/1994 |
| JP | 6-59725 | 3/1994 |
| JP | 6-149357 | 5/1994 |
| JP | 6-313795 | 11/1994 |
| JP | 7-281753 | 10/1995 |
| JP | 8-266701 | 10/1996 |
| JP | 9-6947 | 1/1997 |
| JP | 2000-339028 | 12/2000 |

(Continued)

*Primary Examiner*—Brian A Zimmerman  
*Assistant Examiner*—Nabil H Syed  
(74) *Attorney, Agent, or Firm*—Oblon, Spivak, McClelland, Maier & Neustadt, P.C.

(57) ABSTRACT

A position identification apparatus includes a storage section storing a position-unique information database containing, each position on a field and unique information generated from the signal strength of the reflected wave at the position in association with each other, an ultrasonic transmission section originating an ultrasonic wave assigned identification information, an ultrasonic reception section receiving the reflected wave of the ultrasonic wave, a unique information generation section generating signal unique information from the reflected wave, and a position identification section making a comparison between the signal unique information generated by the unique information generation section and the unique information included in the position-unique information database and identifying the current position.

17 Claims, 16 Drawing Sheets

FOREIGN PATENT DOCUMENTS

| | | |
|---|---|---|
| JP | 2001-147716 | 5/2001 |
| JP | 2001-179668 | 7/2001 |
| JP | 2001-521212 | 11/2001 |
| JP | 2002-215238 | 7/2002 |
| JP | 2002-244733 | 8/2002 |
| JP | 2003-14836 | 1/2003 |
| JP | 3532167 | 3/2004 |
| JP | 2004-157764 | 6/2004 |

* cited by examiner

ULTRASONIC
TRANSMISSION
DIRECTION

601

ULTRASONIC
TRANSMISSION
DIRECTION

| ROOM NUMBER | POSITION COORDINATES | | TOTAL | | | | SENSOR 1 | | | | ... | SENSOR 8 | | | | INITIAL DIRECTION |
| --- | --- | --- | --- | --- | --- | --- | --- | --- | --- | --- | --- | --- | --- | --- | --- | --- |
| | Y COORDINATE | X COORDINATE | $T_1$ | $T_2$ | $T_3$ | ... | $T_n$ | $T_1$ | $T_2$ | $T_3$ | ... | $T_n$ | ... | $T_1$ | $T_2$ | $T_3$ | ... | $T_n$ | |
| 1 | 1 | e | | | | | | | | | | | | | | | | | 1 |
| 1 | 1 | f | | | | | | | | | | | | | | | | | 1 |
| ... | ... | ... | | | | | | | | | | | | | | | | | |

SELF-POSITION IDENTIFICATION APPARATUS AND SELF-POSITION IDENTIFICATION METHOD

CROSS-REFERENCE TO RELATED APPLICATION

This application is based upon and claims the benefit of priority form the prior Japanese Patent Application No. 2004-179822, filed on Jun. 17, 2004; the entire contents of which are incorporated herein by reference.

BACKGROUND OF THE INVENTION

1. Field of the Invetion

This invention relates to a self-position identification apparatus and a self-position identification method of identifying the self-position by a single unit.

2. Description of the Relted Art

Hitherto, an autonomous mobile unit for freely moving in a field, such as an automobile or a robot, has had a displacement amount detection sensor such as a gyro or a pulse encoder as a method of detecting the move distance or the move direction for detecting the travel direction, the travel distance, etc. However, in detection of the displacement amount detection sensor, it is difficult to establish a complete method of identifying the self-position singly by the autonomous mobile unit because of a slip on the move face, the accumulated error of the sensor itself, etc. Thus, various arts are designed for determining the self-position.

For example, an art of providing a signal originator aside from a mobile unit like the GPG (Global Positioning System) is generally known. (For example, refer to Japanese Patent Application (Kokai) No. 6-35535.) In the art disclosed in the JP-A-6-035535, a signal transmitter is previously installed indoors for transmitting and receiving a signal to and from a mobile robot, and the self-position is detected from the time required for transmitting and receiving the signal.

An art of providing intentionally a clue to determining the self-position is available. A mark such as a landmark is installed on a move route and the positional relationship with the installed mark is found for identifying the self-position. (Refer to Japanese Patent Application (Kokai) No. 2001-179668.)

An art of measuring the surrounding landform using a distance sensor and comparing the landform with previously stored map information for determining a current position is also available. CAD data made up of indoor shape data and attribute data indicating a reflection coefficient, etc., is held, an optimum sensor for conducting measurement is selected based on the attribute data, measurement is conducted using the selected sensor, and a comparison is made between the measurement value and the CAD data for identifying the self-position. Further, for a location that cannot be detected with the sensor, a gyro, etc., is used in combination to identify the position. (For example, refer to Japanese Patent Application (Kokai) No. 7-281753.)

However, the related arts involve the following problems: In the art disclosed in the JP-A-6-35535, equipment needs to be previously installed and the preparation is intricate and in addition, the art lacks practicality depending on the application to use in an environment wherein equipment cannot be installed for some reason, etc., and a problem of poor feasibility results.

In the art disclosed in the JP-A-2001-179668, equipment is automatically installed and thus preparation is not required; however, for example, for use at home, if a mark is installed without permission, a problem of limiting the life occurs. Identifying the self-position singly by an apparatus is preferred.

Further, in the JP-A-7-281753, an optimum sensor is selected based on the attribute data. However, accurate landform data may be unable to be obtained with any sensor depending on the position by the effects of absorption, dispersion, transmission, etc., because of the complicated environment, and it becomes difficult to accurately identify the position in the complicated environment.

SUMMARY OF THE INVENTION

It is therefore an object of the invention to provide a self-position identification apparatus and a self-position identification method capable of accurately identifying the position regardless of whether the environment is simple or complicated and identifying the position singly.

According to one aspect of the invention, there is provided a self-position identification apparatus including storage device for storing position association unique information provided by associating position coordinates and unique information indicating a unique feature amount associated with the position coordinates; transmission device for originating a detection signal assigned identification information; a reception device for receiving a reflection signal corresponding to the detection signal transmitted by the transmission device; generation device for generating signal unique information from the reflection signal received by the reception device; and identification device for making a comparison between the signal unique information generated by the generation device and the unique information associated with the position coordinates included in the position association unique information and identifying the current position.

By thus configuration, it is possible to accurately identify the position even in a complicated environment wherein a reflection signal affected by disturbance of transmission, dispersion, absorption, etc., or a wall, a floor, etc., forming a movable field or a secondary or tertiary reflection signal is received, for example.

Since complete position identification can be accomplished singly by the apparatus, it is possible to accurately identify the position even in an environment wherein a mark, an external auxiliary signal, etc., cannot be installed.

BRIEF DESCRIPTION OF THE DRAWINGS

In the accompanying drawings:

FIG. 12 is a drawing to show the structure of the position-unique information database as the embodiment of the position identification apparatus;

DESCRIPTION OF THE EMBODIMENTS

An embodiment of a self-position identification apparatus or a self-position identification method according to the invention will be discussed in detail with reference to the accompanying drawings.

Figure 1:
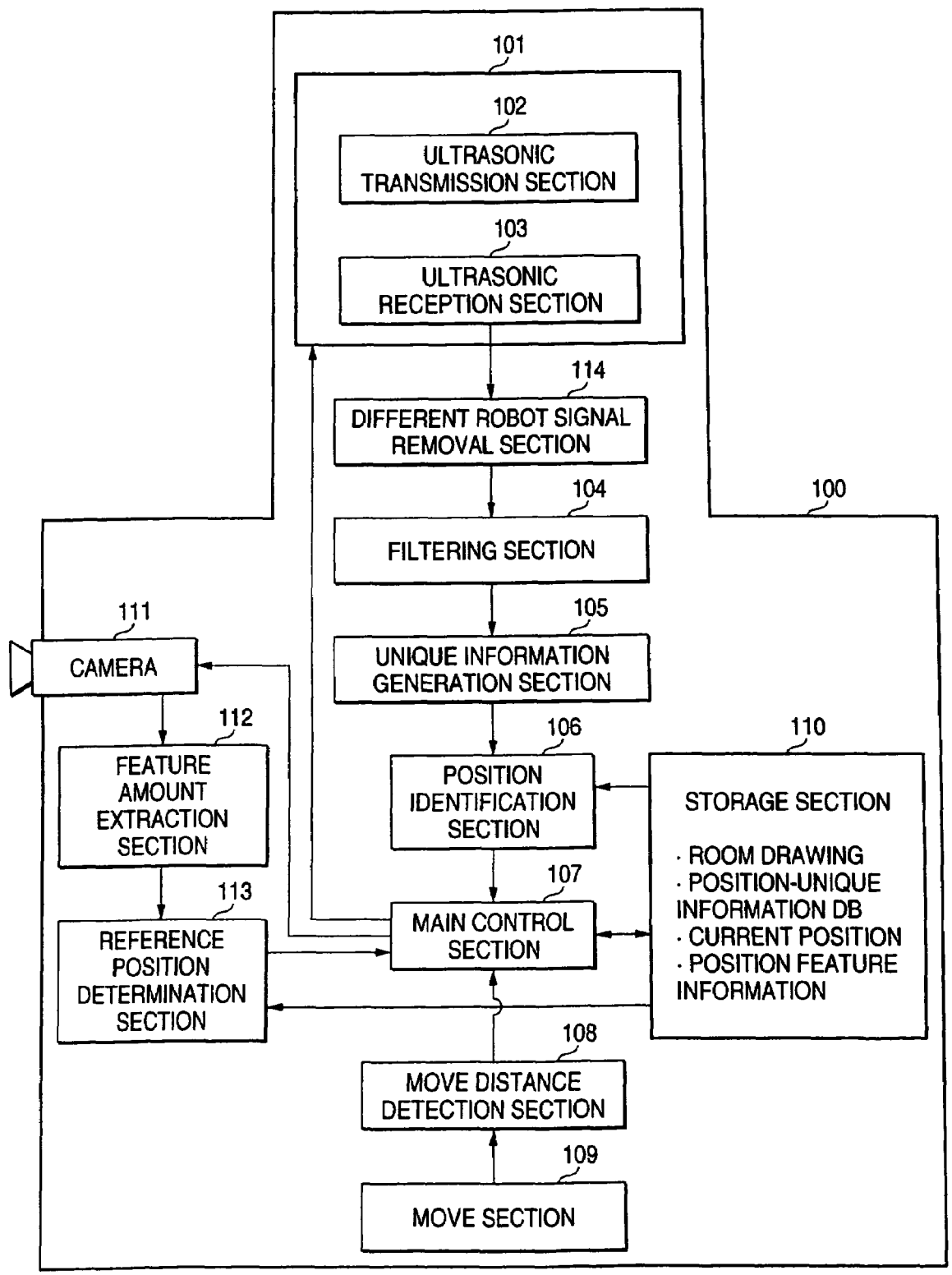
FIG. 1 is a diagram to show the functional block configuration of a mobile robot of a position identification apparatus according to the embodiment of the invention.

FIG. 1 is a block diagram to show the configuration of a mobile robot 100 according to an embodiment of the invention.

As shown in FIG. 1, the mobile robot 100 of the embodiment is made up of an ultrasonic sensor 101, a filtering section 104, a unique information generation section 105, a position identification section 106, a main control section 107, a move distance detection section 108, a move section 109, a storage section 110, a camera 111, a feature amount extraction section 112, a reference position determination section 113, and a different robot signal removal section 114.

The ultrasonic sensor 101 is made up of an ultrasonic transmission section 102 and an ultrasonic reception section 103. In the embodiment, one device acts as the ultrasonic transmission section 102 and the ultrasonic reception section 103, but the invention is not limited to the mode. A dedicated device may be provided for each of the ultrasonic transmission section 102 and the ultrasonic reception section 103. The ultrasonic transmission section 102 forms a transmission device in the embodiment of the invention, and generates an ultrasonic wave according to input from the main control section 107 described later. The ultrasonic reception section 103 forms a reception device in the embodiment of the invention. The ultrasonic reception section 103 receives a reflected wave resulting from reflecting the ultrasonic wave transmitted from the ultrasonic transmission section 102 by a wall, etc., and outputs signal information of the received reflected wave to the different robot signal removal section 114 described later.

Figure 2:
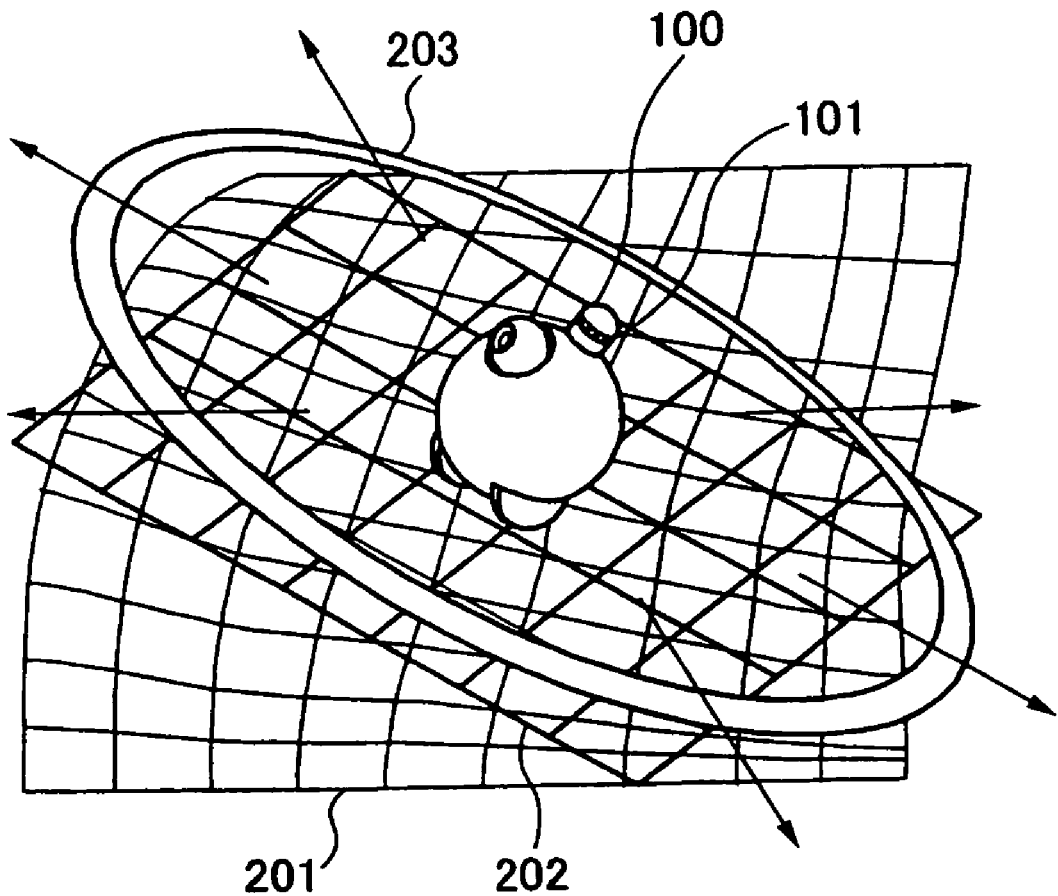
FIG. 2 is a drawing to show a state in which the mobile robot of the embodiment of the position identification apparatus transmits ultrasonic waves radially from a move plane for coming in contact with a move face.

FIG. 2 is a drawing to show a state in which the mobile robot 100 of the embodiment transmits ultrasonic waves radially from a move plane 202 for coming in contact with a move face 201. As shown in the figure, the mobile robot 100 uses the plane coming in contact with the move face 201 at the current position of the mobile robot 100 as the robot move plane 202, and transmits ultrasonic waves 203 radially from the move plane 202 from the ultrasonic sensor 101.

In the embodiment, the ultrasonic sensor 101 is used as the transmission device and the reception device, but the devices are not limited to the sensor in the embodiment of the invention. For example, an optical sensor may be used. As the ultrasonic sensor 101 is used as the transmission device and the reception device, the embodiment is characterized by the fact that the effects of the position and the strength of the light source and the time of day and night as with the optical sensor are not received when the self-position is identified.

Figure 3:
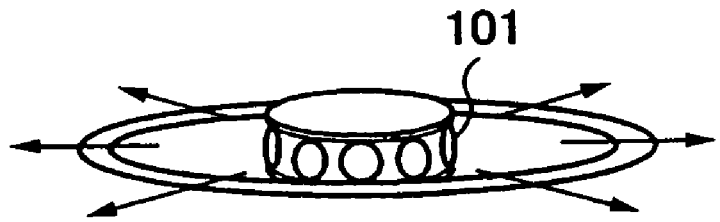
FIG. 3 is a drawing to show ultrasonic sensors annularly arranged to transmit and receive ultrasonic waves non-directionally with respect to the move plane as the embodiment of the position identification apparatus.

FIG. 3 shows a placement example of the ultrasonic sensors 101 in the embodiment. In the example shown in FIG. 3, the directional ultrasonic sensors 101 are arranged annularly for artificially providing non-directivity. After ultrasonic waves are transmitted at the same time from the ultrasonic sensors 101 arranged annularly, processing described later is performed, whereby it is made possible to identify the position at high speed. In the embodiment, to simplify the description, it is assumed that the mobile robot 100 is provided with eight ultrasonic sensors 101 for originating ultrasonic waves at the same time, but the number of the ultrasonic sensors arranged annularly is not limited in the embodiment of the invention.

Figure 4:
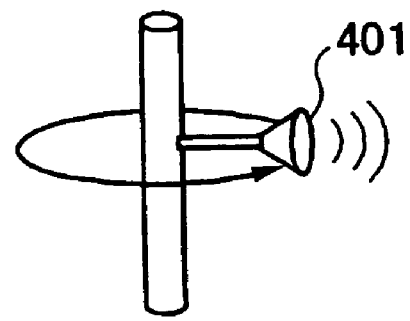
FIG. 4 is a drawing to show an ultrasonic sensor installed so as to scan every given angle with the axis rotated to transmit and receive ultrasonic waves in every direction with respect to the move plane as the embodiment of the position identification apparatus.

As a different example from the embodiment, a placement example of an ultrasonic sensor 401 is shown in FIG. 4. The directional ultrasonic sensor 401 can be rotated with the normal to the plane where a mobile robot 400 moves as an axis. The ultrasonic sensor 401 rotates and transmits an ultrasonic wave at every arbitrary angle and the reflected wave of the ultrasonic wave is acquired. This operation is repeated until the ultrasonic sensor 401 makes a round, thereby performing a scan function equivalent to that of annular arrangement of the ultrasonic sensors 401. To rotate the ultrasonic sensor 401 for scanning, the number of the used ultrasonic sensors 401 is not limited. Specifically, when n ultrasonic sensors 401 are arranged at equal intervals on the same circle, they may be rotated at least at 360/n degrees. Accordingly, there can be provided the mobile robot 100 having a scan function equivalent to that of annular arrangement of the ultrasonic sensors and being more inexpensive regardless of the number of the ultrasonic sensors 401. The axis is not limited to the normal to the plane where the mobile robot 100 moves.

Figure 5:
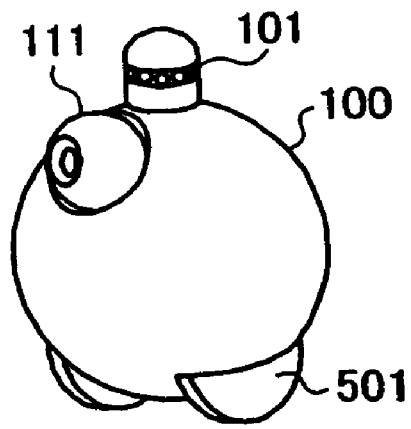
FIG. 5 is a drawing to show an example wherein the mobile robot of the position identification apparatus according to the embodiment has the ultrasonic sensors installed on the head.

FIG. 5 is a drawing to show the mobile robot 100 with an unit composed of the ultrasonic sensors 101 installed on the head. As shown in the figure, the mobile robot 100 has the ultrasonic sensors 101 installed on the head and can move with wheels 301. The visual field is opened omni directionally, the mobile robot 100 does not become an obstacle to ultrasonic waves, and it is made possible to reduce noise from an obstacle temporarily placed on a floor.

Figure 6:
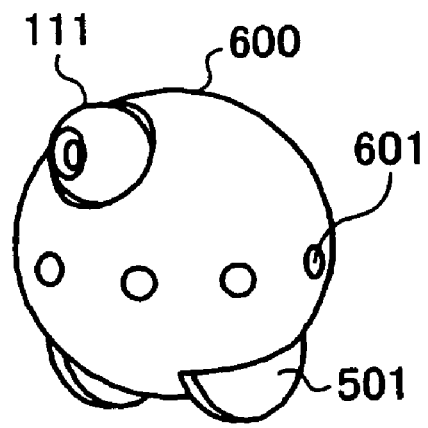
FIG. 6 is a drawing to show an example wherein the mobile robot of the position identification apparatus according to the embodiment has the ultrasonic sensors installed on the periphery of the mobile robot.

As a different example from the embodiment, FIG. 6 shows an example wherein ultrasonic sensors 601 are installed on the periphery of a mobile robot 600. The installation positions of the ultrasonic sensors on the mobile robot are not limited to those shown in FIG. 5 or 6 and the ultrasonic sensors may be placed at any positions if ultrasonic waves can be transmitted radially to the robot move plane 202.

Figure 7A:
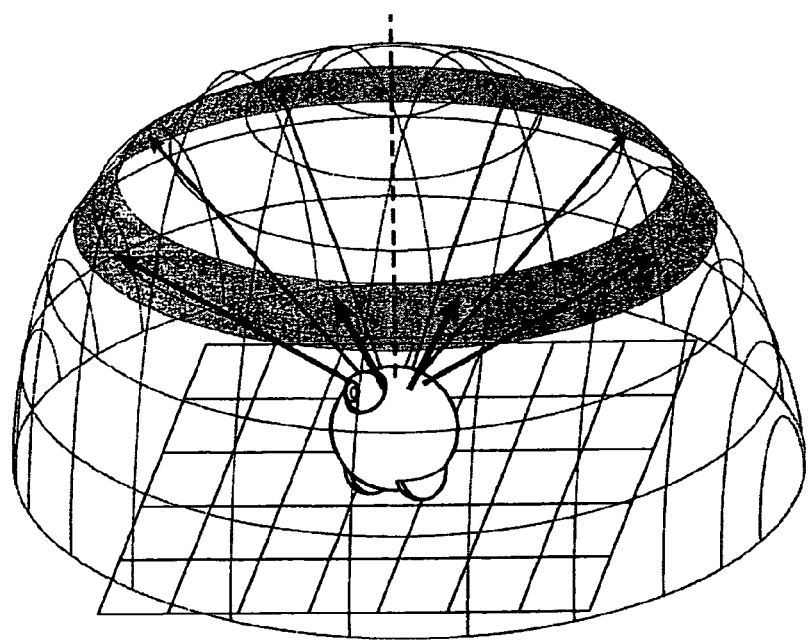
FIG. 7A is a perspective view showing the ultrasonic waves are transmitted from the ultrasonic sensors of the mobile robot.
Figure 7B:
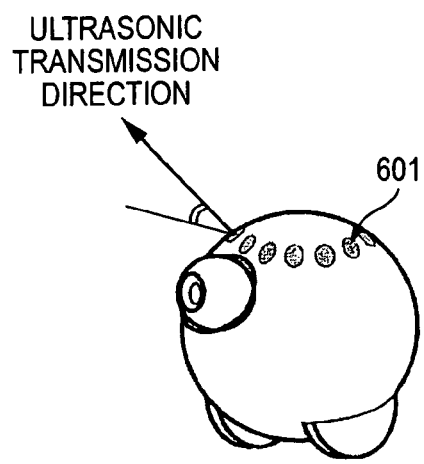
FIG. 7B, 7C is a drawing showing examples of the mobile robot of the position identification apparatus according to the embodiment of the invention has ultrasonic sensors described in FIG. 7A.
Figure 7C:
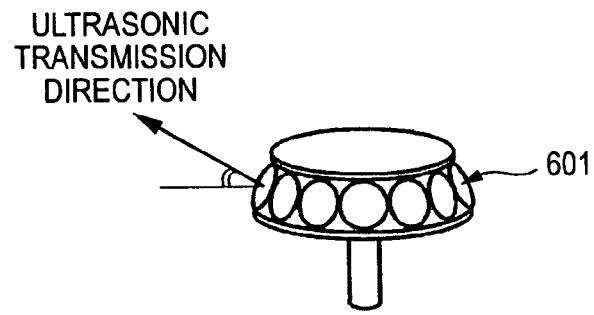

For example, it is not limited that the ultrasonic waves are transmitted from the ultrasonic sensors 601 only in a direction parallel to the robot move plane. As shown in FIG. 7A, the transmitted ultrasonic waves may be substantially formed in spherical wave such as a dome-shape, or a part of the spherical wave to be rotation symmetry with respect to a center axis perpendicular to the robot move plane 202. As shown in FIGS. 7B and 7C, the ultrasonic sensor is annularly arranged around the center axis at predetermined angle from a direction of the robot move plane 202. The annual arrangement of the ultrasonic sensors 601 may be not only in one line but also in plural lines on the same axis line. Further, the predetermined angle at which the ultrasonic wave is transmitted from the ultrasonic sensors 601 can be changed in each line of the annual arrangement when the annual arrangement of the ultrasonic sensors 601 is in plural lines on the same axis line.

Figure 8:
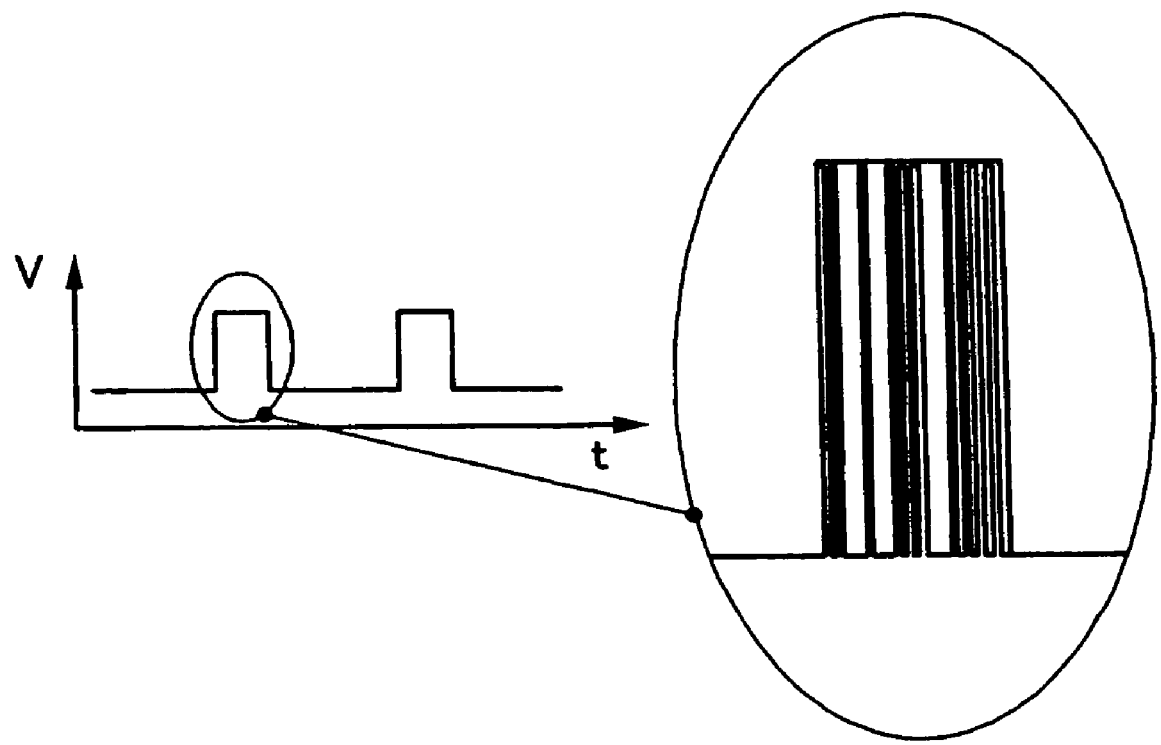
FIG. 8 is a drawing to show an example of an ultrasonic signal containing code information for mobile unit identification transmitted from the ultrasonic sensor as the embodiment of the position identification apparatus.

In the embodiment, identification information is assigned to each ultrasonic wave transmitted from the ultrasonic transmission section 102. FIG. 8 shows the ultrasonic wave transmitted with the identification information assigned thereto. That is, usually as the ultrasonic wave, five to ten pulses are transmitted all at a time at a given frequency and as the vibration of the ultrasonic transmission section 102 is controlled so that the ultrasonic wave origination intervals differ, it is made possible to contain code information as identification information unique to the mobile robot 100 in the transmitted ultrasonic wave pulse group. The code information is used as identification code.

Referring again to FIG. 1, the different robot signal removal section 114 forms a removal device in the invention and removes the ultrasonic wave transmitted from any other mobile robot 100 based on the identification code of the ultrasonic wave input from the ultrasonic reception section 103 of the ultrasonic sensor 101. If a plurality of mobile robots 100 move in the same room and the ultrasonic waves transmitted from the mobile robots 100 are mixed, the different robot signal removal section 114 makes it possible to identify the accurate current position.

Figure 9:
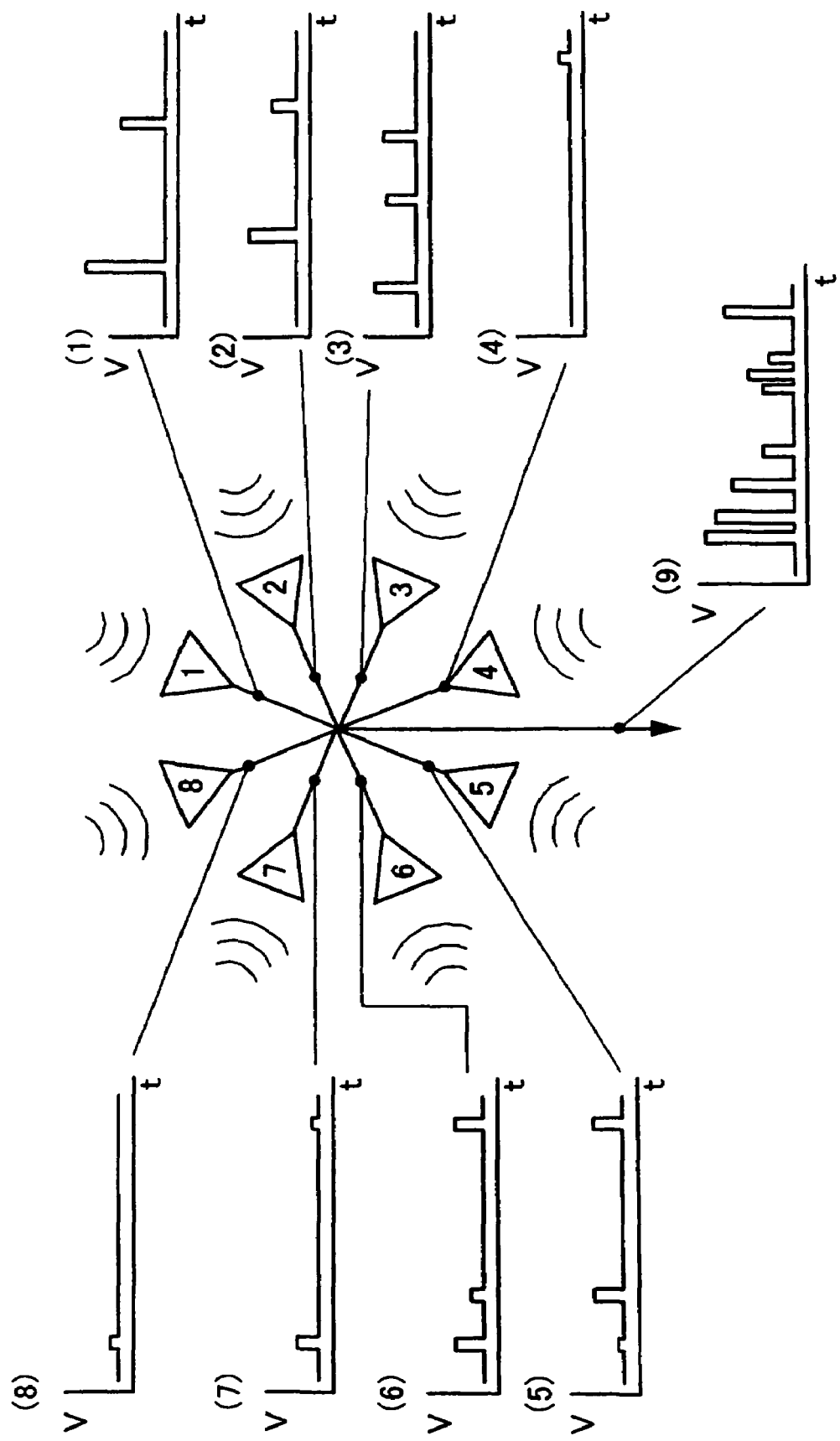
FIG. 9 is a conceptual drawing to show a state in which the total signal unique information is found from signal unique information acquired in each of the sensors placed annularly as the embodiment of the position identification apparatus.

The unique information generation section 105 forms a generation device in the embodiment of the invention; it generates signal unique information indicating unique information at each position in a move field from signal information of a reflected wave output through the filtering section 104 described later, and outputs the generated signal unique information to the position identification section 106. In the embodiment, the signal strength of a reflected wave changing with the elapsed time since the reference time, the ultrasonic wave originating time, is used as the signal unique information. The signal strength forms feature amount in the embodiment of the invention. The signal unique information for each sensor is totalized to generate the signal unique information of the robot position. FIG. 9 is a conceptual drawing for totalizing the signal unique information acquired in each sensor to find the total signal unique information of all sensors. Numerals 1 to 8 shown in the figure indicate the ultrasonic sensors 101 installed on the mobile robot 100, (1) to (8) indicate each the signal strength of the reflected wave changing with the elapsed time since the reference time in each sensor, and (9) indicates the sum total of the signal strength of the reflected wave changing with the elapsed time since the reference time in each sensor. As shown in the figure, the sensors are installed radially, so that the signal unique information of each sensor is totalized, whereby it is made possible to assume that it is the signal unique information proper to the position based on the reflected wave received from the radiation direction. Since the signal strength of the reflected wave changing with the elapsed time since the reference time is used as the signal unique information, special operation to find the signal unique information is not required and it is made possible to acquire the signal unique information at high speed. The signal unique information is not limited to the signal strength of the reflected wave changing with the elapsed time since the reference time. For example, the frequency component calculated by conducting frequency analysis of the received reflected wave may be used as the signal unique information.

The filtering section 104 forms filtering device in the invention; it removes noise by filtering from the signal information of the reflected wave input from the different robot signal removal section 114 and then outputs the reflected wave signal information subjected to the filtering to the unique information generation section 105. Accordingly, it is made possible to identify the current position if the reflected wave contains noise.

Figure 10:
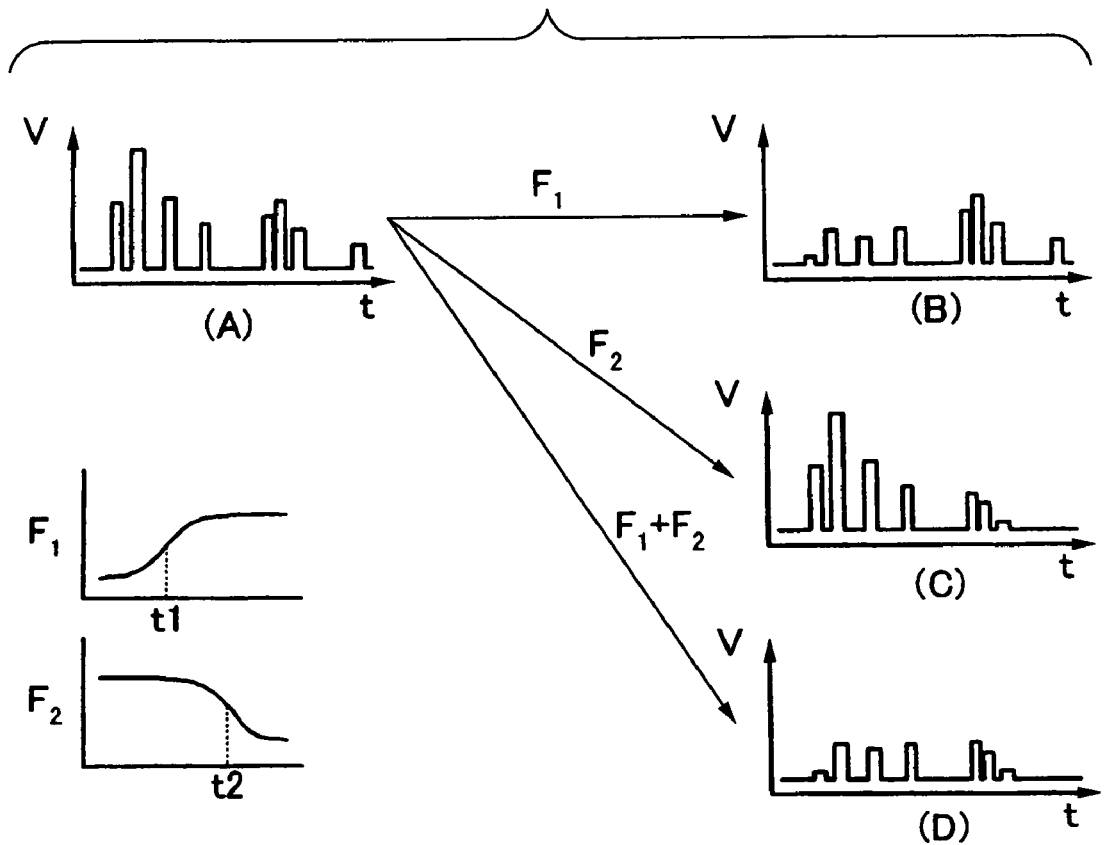
FIG. 10 is a drawing to show filtering for changing the weight in response to the time for the reflected wave received from an ultrasonic reception section as the embodiment of the position identification apparatus.

FIG. 10 is a drawing to show the concept of the filtering performed by the filtering section 104. In the figure, filtering is performed for the reflected wave signal information provided from the ultrasonic reception section 103, shown in graph (A) through filters F1 and F2 and the reflected wave signal information subjected to the filtering is shown in graphs (B), (C), and (D). The filter F1 is a filter for reducing noise produced in the presence of an obstacle moving in the proximity of the mobile robot 100 largely affecting the correlation (for example, a human being or an animal). In contrast, filter F2 is a filter for reducing distant, nonstationary disturbance noise. The graph (B) shows the reflected wave signal information output after being subjected to the filtering through F1; the graph (C) shows the reflected wave signal information output after being subjected to the filtering through F2; and graph (D) shows the reflected wave signal information output after being subjected to the filtering through F1 and F2.

The function of the filter F1 for reducing noise produced in the presence of a nearby obstacle is a change function of the strength of the reflected wave signal information output in response to the time until arrival of the reflected wave and more particularly is a function of lightening the weight of the signal strength based on the arrival time of the reflected wave from the proximity. In the embodiment, the minimum signal strength is set to 0 V, but the invention is not limited to it.

Time t1 in the graph indicating the filter F1 in FIG. 10 is referred to as first obstacle determination time. The first obstacle determination time forms first reference time in the embodiment of the invention and refers to the ultrasonic arrival time used as the reference for determining that a reflected wave by an obstacle moving, etc., in the proximity of the mobile robot 100 (containing the case where a human being, etc., temporarily passes through) after the mobile robot 100 transmits an ultrasonic wave. If a reflected wave is received in the first obstacle determination time since the ultrasonic wave was transmitted, the strength of the reflected wave signal information output after through the filter F1 becomes the intermediate value between the minimum signal strength and the signal strength of the input reflected wave signal information. The specific value of the first obstacle determination time changes depending on how much an object is close to the mobile robot 100 to handle as an obstacle. In the embodiment of the invention, if an object existing within 0.5 m is defined as an obstacle, 0.00292 sec found from the ultrasonic wave velocity 343 m/sec becomes the first obstacle determination time. The first reference time is not limited to the embodiment of the invention. The first reference time may be a time used as the reference for determining that the received signal is a signal reflected by an obstacle in the proximity of the reception.

The function of the filter F2 for reducing distant, nonstationary disturbance noise is a change function of the strength of the reflected wave signal information output in response to the time until arrival of the reflected wave and more particularly is a function of lightening the weight of the signal strength based on the arrival time of the reflected wave from a distant location.

Time t2 in the graph indicating the filter F2 in FIG. 10 is referred to as second obstacle determination time. The second obstacle determination time forms second reference time in the embodiment of the invention. The second obstacle determination time refers to the ultrasonic arrival time used as the reference for determining that the received reflected wave is a reflected wave of distant, nonstationary disturbance noise after the mobile robot 100 transmits an ultrasonic wave. If a reflected wave is received after the expiration of the second obstacle determination time since the ultrasonic wave was transmitted, the strength of the reflected wave signal information output after through the filter F2 becomes the intermediate value between the minimum signal strength and the strength of the input reflected wave signal information. The specific value of the second obstacle determination time changes depending on how much a received reflected wave is distant from the mobile robot 100 to handle as disturbance noise considering the size of a room and the maximum operation range of ultrasonic wave. In the embodiment, if the reflected wave at a distance of 5 m or more from the mobile robot 100 is defined as disturbance noise, 0.0583 sec found from the ultrasonic wave velocity 343 m/sec becomes the second obstacle determination time. The second reference time in the invention is not limited to the embodiment, and may be a time used as the reference for determining that the received signal is a signal caused by distant disturbance noise.

In the embodiment, filtering is performed by the filtering section 104 after reception in the ultrasonic reception section 103, but the invention is not limited to performing the filtering just after acquisition of the reflected wave signal information. For example, it is also possible to conduct frequency analysis on the reflected wave signal information by the unique information generation section 105 and then filter the frequency component after the frequency analysis using a hgihpass filter or a low-pass filter.

Referring again to FIG. 1, the position identification section 106 forms a position identification device in embodiment of the invention. the position identification section 106 identifies the current position of the mobile robot 100 based on the signal unique information input from the unique information generation section 105 and unique information registered in a position-unique information database stored in the storage section 110 described later. A processing procedure until identification of the current position of the mobile robot 100 and a processing procedure until determination of the initial direction at the current position of the mobile robot 100 are described later.

The storage section 110 forms storage device in embodiment of the invention. The storage section 110 stores a room drawing, the above-mentioned position-unique information database, the current position, and position feature information. The storage section 110 refers to a record medium of an HDD (hard disk drive), etc., for example. The information stored in the storage section 110 is not limited to them.

The room drawing stored in the storage section 110 refers to a drawing to show a room in which the mobile robot 100 moves. In the embodiment, the CAD data and the design drawing of the room are input, but the room drawing acquisition method is not limited to input of the CAD data or the design drawing. For example, if the mobile robot 100 is first installed in a room, the room may be measured using an included sensor, etc., and map information may be prepared.

Figure 11:
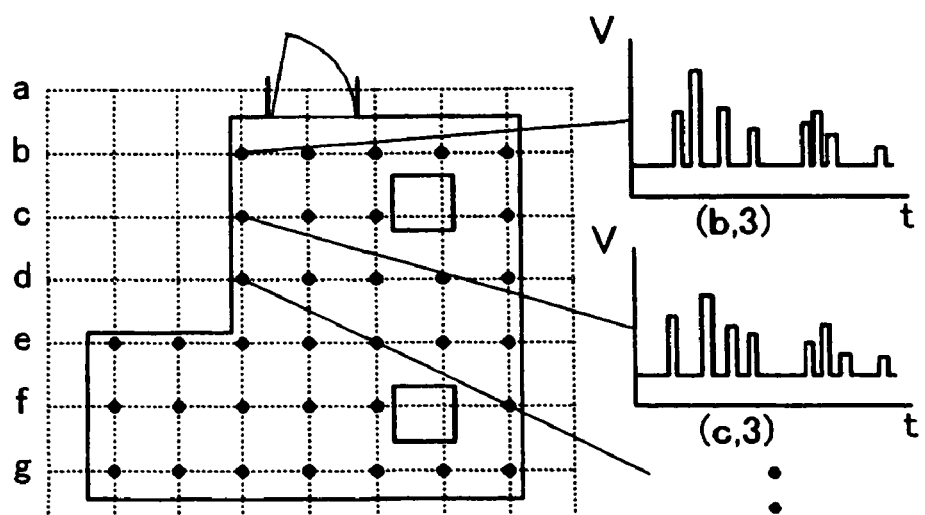
FIG. 11 is a conceptual drawing to represent lattice points indicting the collection positions of unique information on a room drawing and unique information associated with the lattice points in a position-unique information database as the embodiment of the position identification apparatus.

The position-unique information database stored in the storage section 110 forms position signal correspondence information in the embodiment of the invention. The position-unique information database retains the position coordinates of each lattice point on the room drawing and signal unique information collected at the lattice point in association with each other as unique information. The position-unique information database is used for the mobile robot 100 to identify the self-position. FIG. 11 shows the correspondence between each lattice point on the room drawing and the unique information. In the figure, the unique information is shown only for coordinates (b, 3) and coordinates (c, 3), but the position-unique information database retains all lattice points and the unique information in association with each other.

FIG. 12 shows an example of the data structure in the position-unique information database. In the figure, X and Y coordinates indicating the positions of lattice points, the reflected wave signal strength in each sensor and the total reflected wave signal strength in all sensors, received in the time resulting from separating the arrival time from the reference time at proper sampling interval, and the initial directions of the mobile robot 100 on the room drawing at the unique information collection time are retained in association with each other. The initial directions on the room drawing are represented by numbers of 1 to 8 so that the numbers 1 to 8 correspond to the clockwise directions every 45 degrees in such a manner that 1 indicates the north and 2 indicates the northeast. The directions are used to identify the direction of the mobile robot 100 at the moving time. What time period from the reference time is held as the database is determined considering the ultrasonic wave velocity, the size of the room, etc. By the way, in the embodiment, eight sensors are included and the angle between the sensors becomes 45 degrees. This means that the signal unique information collected for each sensor is adopted as the unique information for each sensor. The unique information for each sensor forms unique information for each piece of angle information in the invention. A plurality of pieces of unique information can also be retained for one position in the position-unique information database. The initial directions on the room drawing are not limited to the numbers of 1 to 8 and can be changed corresponding to the number of the sensors installed on the mobile robot 100.

In the embodiment, the unique information of all sensors and the unique information for each sensor are retained, but the invention is not limited to the mode. For example, only the unique information of all sensors or only the unique information for each sensor may be retained. In addition, if the direction of the mobile robot 100 need not be identified because the mobile robot 100 includes an azimuth detection section, etc., it is not necessary to retain the initial direction of the mobile robot 100 at the unique information collecting time.

The current position stored in the storage section 110 refers to information of the current position of the mobile robot 100 shown on the room drawing in the movable range.

The position feature information stored in the storage section 110 refers to storage information of the feature amount extracted from image data photographed by the camera 111 by the feature amount extraction section 112 in association with the photograph position coordinates. The position indicated by the position coordinates retained in the position feature information is used as the reference position, and the feature amount extracted from the image data photographed at the reference position is used as the reference feature amount. The reference position and the reference feature amount corresponding to the reference position are used as the reference for first collecting unique information or is used when the current position is recognized if identifying the current position fails. The position feature information is used for determining whether or not the position is the reference position in the reference position determination section 113 described later. The number of the reference feature amounts stored as the position feature information may be smaller than the number of pieces of the unique information.

The main control section 107 forms an update device in the invention. The main control section 107 updates or adds unique information in or to the position-unique information database based on information provided by the position identification section 106 and in addition, updates or adds information in or to the current position, the position feature information stored in the storage section 110 and controls a move of the move section 109, origination of ultrasonic waves from the ultrasonic sensors 101, photographing of the camera 111, etc.

The main control section 107 updates the unique information registered in the position-unique information database in response to change in the environment of a room. For example, to use the mobile robot 100 in a space where a human being lives, the situation of the space changes moment by moment and if the change is minute, there is a possibility that the accumulated error may become large affecting position identification. Thus, if the position of the mobile robot 100 is identified as the position indicated by the lattice point in the position-unique information database at the identifying time in the position identification section 106, the main control section 107 updates the signal unique information acquired from the unique information generation section 105 as the unique information in association with the lattice point indicating the current position. Accordingly, if the environment of the room changes, it is made possible to identify the current position. The main control section 107 may perform stepwise update processing rather than replacement of the information at a time, namely, may update the unique information using unique information provided by combining the already registered unique information and newly acquired unique information at a proper ratio (for example, combining the already registered unique information and newly acquired unique information at a ratio of 9:1). As such stepwise update processing is performed, it is made possible to reduce the effects of the disturbance elements of electric noise, reflected waves from a human being, an animal, etc., happening to be present, etc.

If the feature amount extracted in the feature amount extraction section 112 described later is output through the reference position determination section 113, the main control section 107 stores the feature amount in the position feature information in the storage section 110 in association with position, attitude information of the mobile robot 100 when photographed by the camera 111 described later.

The move section 109 forms a move device in the embodiment of the invention. The move section is a mechanism required for the mobile robot 100 to move under the control of the main control section 107. In the embodiment, a differential two-wheel mobile robot is adopted as the mobile robot 100, but the move section 109 may be any move mode other than the wheel type used with the differential two-wheel mobile robot. For example, crawler type, walking type, etc., can be named.

The move distance detection section 108 acquires the move distance of the mobile robot 100 by the move section 109 and outputs the acquired distance, etc., to the main control section 107. In the embodiment, the move distance is measured using any other sensor such as an encoder attached to the axle of the mobile robot 100. In the embodiment, the move distance is acquired by the move distance detection section 108, but the move distance detection section 108 is not necessarily required in the invention and the position identification section 106 described later may always identify the current position of the mobile robot 100. The move distance detected by the move distance detection section 108 and identification of the current position of the mobile robot 100 by the position identification section 106 are used in combination, whereby it is made possible to identify the current position more accurately.

The camera 111 forms a detection device in the invention and photographs the surrounding environment of the mobile robot 100 and outputs the photographed image information to the feature amount extraction section 112 under the control of the main control section 107. At the time of field search action or unique information collection action, the camera 111 photographs the geometrical structure of the border between a wall and a ceiling, a floor, a window frame, and a door frame under the control of the main control section 107. The photographed image data forms environment information in the invention. The sensor of the mobile robot 100 other than the ultrasonic sensors 101 used for identifying the self-position is not limited to the camera 111 of an optical sensor and based on the information detected by the sensor, the feature amount extraction section 112 may be able to extract the feature amount indicating the position.

The feature amount extraction section 112 forms extraction device in the invention and extracts the shape of the pattern put on a wall, a floor, a ceiling, furniture, etc., as the feature amount from the image data output from the camera 111 and outputs the extracted feature amount to the reference position determination section 113.

The reference position determination section 113 forms a determination device in the embodiment of the invention and makes a comparison between the feature amount extracted by the feature amount extraction section 112 and the feature amount included in the position feature information stored in the storage section 110 and determines whether or not the position photographed by the camera 111 is the reference position. The reference position determination section 113 determines whether or not the position photographed by the camera 111 is the reference position not only when the position-unique information database is prepared, but also when the position information of the mobile robot 100 needs to be checked or rest.

Next, a preparation procedure of the position-unique information database will be discussed. After the mobile robot 100 is first installed in a room and a room drawing is acquired, the mobile robot 100 collects unique information at the positions indicated by the lattice points on the room drawing shown in FIG. 11. First, the main control section 107 described later provides lattice points indicating the coordinates for collecting unique information on the acquired room drawing. For the spacing between the lattice points, a proper value is determined from the size of the mobile robot 100, the field width, the accuracy of the used ultrasonic sensors 101, and the expected self-position identifying range.

One of the positions indicated by the lattice points is the move start position of the mobile robot 100 and the mobile robot 100 moves to the position indicated by the next lattice point in sequence by the move section 109 described later with the move start position as the reference. At this time, to eliminate a slip with the floor, the move section 109 needs to move at lower speed than that at the usual time. When the mobile robot 100 arrives at the position indicated by the lattice point, the ultrasonic transmission section 102 for identifying the self-position transmits an ultrasonic wave, the ultrasonic reception section 103 receives the reflected wave, and the unique information generation section 105 generates signal unique information. The main control section 107 acquires the generated signal unique information and adds the acquired signal unique information to the position-unique information database as the unique information in association with the collection point.

Figure 13:
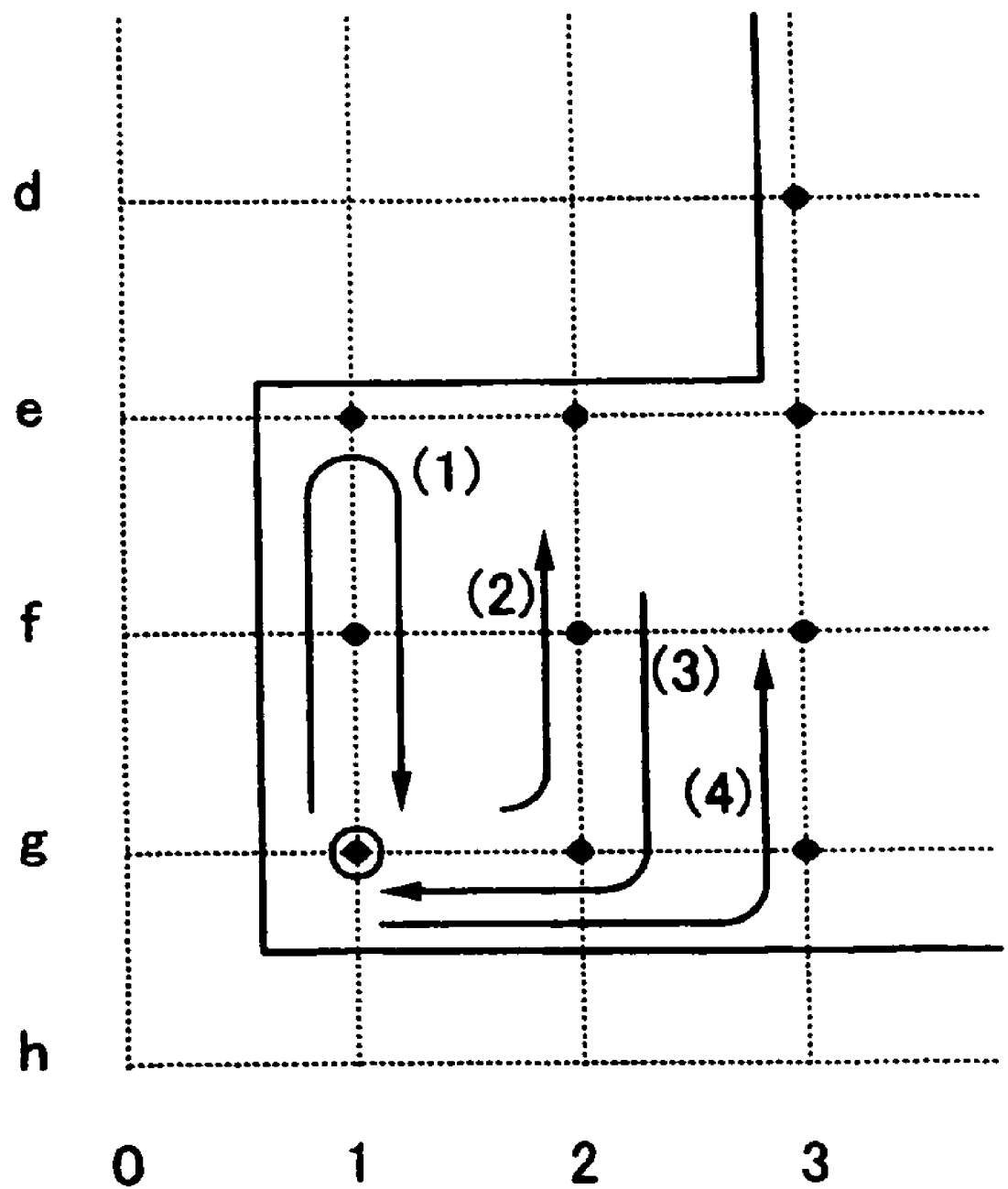
FIG. 13 is a drawing to show paths to collect unique information from the position indicating a lattice point on a room drawing when the mobile robot sets the move start position as the reference position as the embodiment of the position identification apparatus.

FIG. 13 shows a move path when the position-unique information database is generated. In the figure, with the move start origin of the mobile robot 100 (g, 1) as the reference position, the camera 111 photographs the surrounding environment from the reference position and the feature amount extraction section 112 extracts the feature amount from the photographed image data under the control of the main control section 107. At this time, the reference position determination section 113 does not process the feature amount and outputs the feature amount intact to the main control section 107, which then stores the feature amount in the storage section 110 as position feature information in association with the coordinates of the reference position and the attitude of the mobile robot 100. The stored feature amount is adopted as the reference feature amount. Then, the mobile robot 100 collects associated unique information at the positions indicated by the lattice points from the position (g, 1) to a position (e, 1) in a path (1) and then returns to the reference position and the camera 111 again photographs the surrounding environment. The feature amount extraction section 112 extracts the feature amount from the photographed image data. Next, the reference position determination section 113 determines whether or not the feature amount matches the feature amount associated with the reference position in the position feature information first stored in the storage section 110. If it is determined that the feature amounts match, the reference position is determined the current position of the mobile robot 100; if it is not determined that the feature amounts match, the reference position is not determined the current position of the mobile robot 100. The determination result is output to the main control section 107. Upon reception of the determination result to the effect that the current position is not the reference position, the main control section 107 determines that the current position shifts from the reference position, and moves the mobile robot 100 by the move section 109 to correct the shift. Upon reception of the determination result to the effect that the current position is the reference position, the main control section 107 determines that the current position is the reference position, and does not correct the position. Then, the mobile robot 100 moves from a position (g, 2) to a position (e, 2) in a path (2), acquires unique information at the position indicated by each lattice point, again returns to the reference position from a path (3), determines whether or not the current position is the reference position, and correct shift. A similar procedure is also executed in a path (4) and the later, whereby it is made possible to accurately acquire the unique information to be registered in the position-unique information database.

When the unique information is collected to generate the position-unique information database, prefiltering of applying temperature compensation, a weight function, etc., may be performed in response to the situation in addition to filtering of the filtering section 104 and noise removal made by filtering. Further, if the mobile robot 100 prepares a room drawing, the unique information for identifying the self-position may be collected after or at the same time as the search action to prepare the room drawing.

Figure 14:
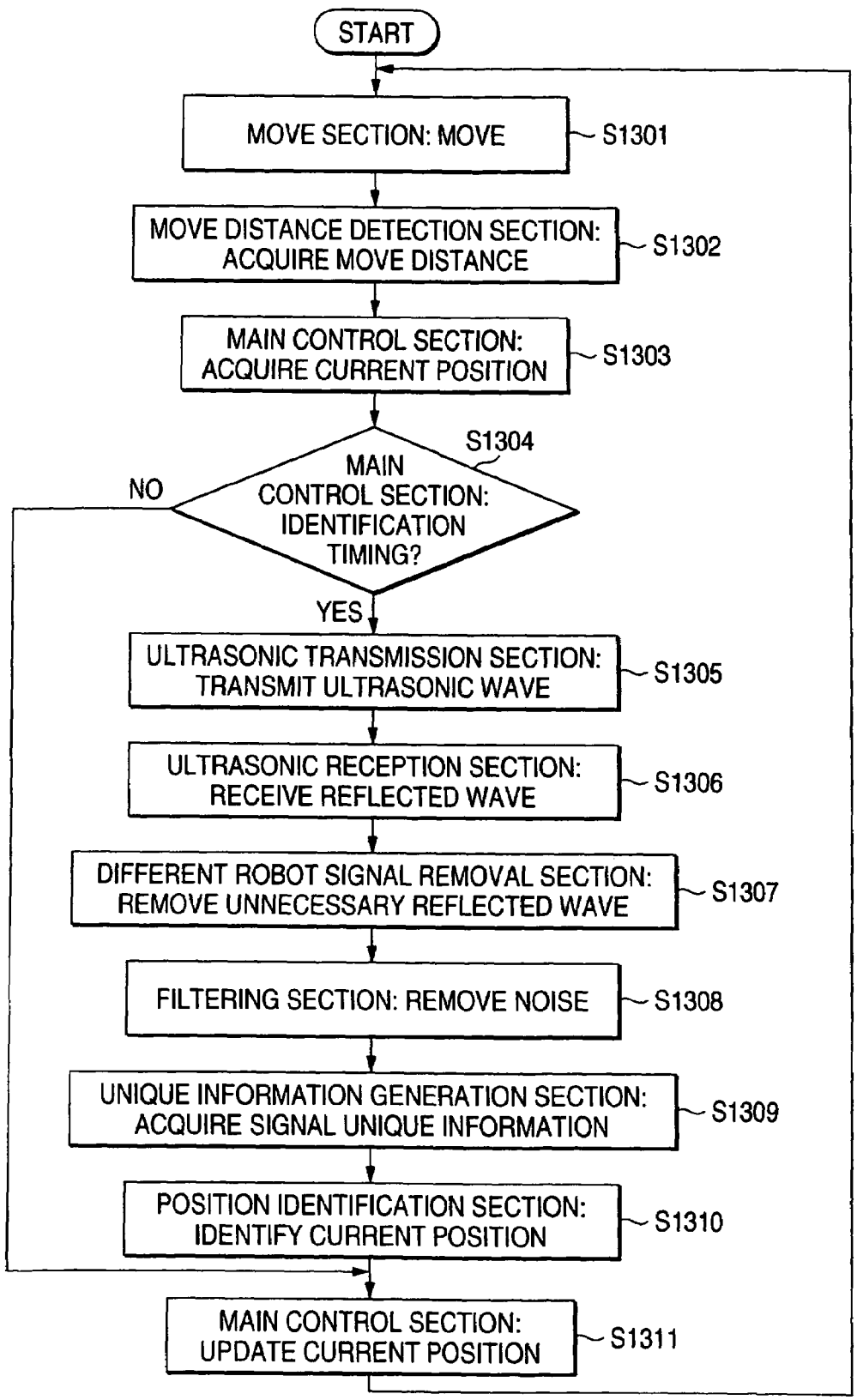
FIG. 14 is a flowchart to show a procedure of usual processing of the mobile robot of the embodiment of the position identification apparatus.

Next, an example of usual processing after collection of the unique information of the mobile robot 100 according to the embodiment described above will be discussed. FIG. 14 is a flowchart to show a procedure example of the usual processing of the mobile robot 100 according to the embodiment. The usual processing of the mobile robot 100 is not limited to the following procedure.

The mobile robot 100 moves by the move section 109 (step S1301). The mobile robot 100 may move following the user or going round to detect an anomaly in the room and the move purpose is not limited. In the embodiment of the invention, the move is called a free move and is distinguished from the move for generating the position-unique information database, etc.

The move distance detection section 108 of the mobile robot 100 acquires the move distance of the move section 109, etc., (step S1302).

The main control section 107 acquires the move distance from the move distance detection section 108 and acquires the current position after the move from the move distance and the current position stored in the storage section 110 indicating the position before the move (step S1303). The main control section 107 determines whether or not the timing is the timing for identifying the current position (step S1304). It is considered that the determination criterion as to whether or not the timing is the timing for identifying the current position may be set as the reference based on which it can be determined that there is a possibility that the current position may shift due to a slip, etc., because of move of a preset move distance or the expiration of a given time. However, the invention is not limited to them; for example, the current position may always be identified after the mobile robot 100 moves.

If the main control section 107 does not determine that the timing is the timing for identifying the current position (NO at step S1304), the main control section 107 updates the current position stored in the storage section 110 to the current position acquired at step S1303 (step S1310).

If the main control section 107 determines that the timing is the timing for identifying the current position (YES at step S1304), the ultrasonic transmission section 102 transmits an ultrasonic wave under the control of the main control section 107 (step S1305), and also outputs the identification code of the transmitted ultrasonic wave to the different robot signal removal section 114.

The ultrasonic reception section 103 receives the reflected wave of the transmitted ultrasonic wave (step S1306), and outputs the received reflected wave to the different robot signal removal section 114.

The different robot signal removal section 114 outputs only the reflected wave involved in the mobile robot 100 to the filtering section 104 based on the identification code of the ultrasonic wave (step S1307). Specifically, the different robot signal removal section 114 determines whether or not the identification code of the ultrasonic wave input from the ultrasonic reception section 103 at the originating time matches the identification code of the ultrasonic wave received from the ultrasonic reception section 103. If they do not match, the different robot signal removal section 114 removes the signal of the ultrasonic wave as an ultrasonic wave of any other mobile robot 100 or noise; if they match, the different robot signal removal section 114 outputs the reflected wave to the filtering section 104 as the signal of the ultrasonic wave involved in the mobile robot 100.

The filtering section 104 removes noise from the reflected wave output from the different robot signal removal section 114 (step S1308). The unique information generation section 105 acquires signal unique information based on the reflected wave with noise removed (step S1309). The position identification section 106 identifies the current position from the acquired signal unique information and the association of the position and unique information with each other, retained in the position-unique information database in the storage section 110 (step S1310). The detailed identification method of the position identification section 106 is described later. The main control section 107 updates the current position stored in the storage section 110 to the identified current position (step S1311).

Then, again the processing procedure is started at free move of the mobile robot 100 by the move section 109 (step S1301).

In the embodiment, it is assumed that the mobile robot 100 stops when the current position of the mobile robot 100 is identified, but the invention is not limited to the mode. If the move distance of the mobile robot 100 is small relative to the fly time of an ultrasonic wave, the current position of the mobile robot 100 can also be identified while the mobile robot 100 is moving.

Figure 15:
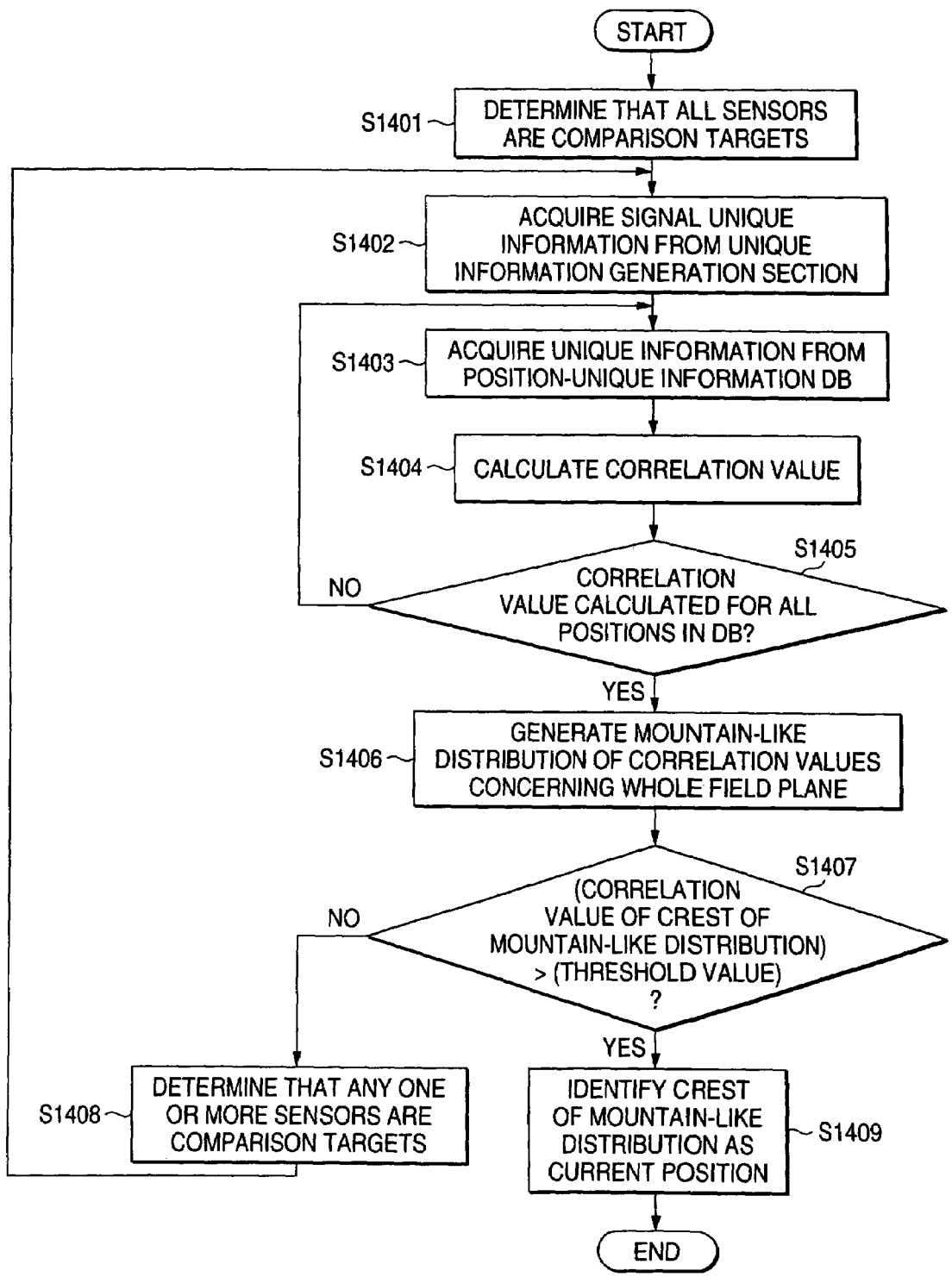
FIG. 15 is a flowchart to show a processing procedure of identifying the current position of the mobile robot of the embodiment of the position identification apparatus.

Next, the identification processing of the current position performed by the position identification section 106 at step S1310 in FIG. 14 will be discussed. FIG. 15 is a flowchart to show a processing procedure of identifying the current position in the position identification section 106 according to the embodiment.

First, the position identification section 106 determines that all sensors are comparison targets for identification (step S1401), acquires the signal unique information provided by totalizing the signal unique information of all sensors from the unique information generation section 105 (step S1402), acquires the unique information provided by totalizing the unique information of all sensors associated with the position (b, 3) from the position-unique information database (step S1403), and calculates the correlation value (step S1404). The correlation value refers to the match degree between the signal unique information acquired from the unique information generation section 105 and the unique information acquired from the position-unique information database.

A calculation expression (expression 1) for calculating the correlation value, used when the signal unique information and the unique information are each the signal strength of the reflected wave changing with the time elapsed since the reference time at which ah ultrasonic wave was transmitted as in the embodiment is as follows:

$$Sxy = \sum_{i=1}^{t} (|\delta[i] - \delta xy[i]|)$$ [Expression 1]

$\delta[i](i = 1, 2, 3, \ldots t)$: unique information measured at free moving time $\delta xy[i](i = 1, 2, 3, \ldots t)$: unique information at coordinates $(x, y)$ rerorded in database Difference sum Sxy between the signal unique information acquired from the unique information generation section 105 every given time interval from the reference time and the unique information associated with the position (b, 3) acquired from the position-unique information database is calculated. The reciprocal of Sxy is adopted as the correlation value at the position (b, 3). It is determined that the higher the correlation value, the higher the correlation between the current position and the position (b, 3). The correlation value calculation method is not limited to the method and may be any method if the value changing depending on the type of unique information and indicating the correlation between the current position and the position retained in the position-unique information database can be calculated.

Referring again to FIG. 15, after the correlation value calculation terminates, the position identification section 106 determines whether the correlation value has been calculated for all positions retained in the position-unique information database (step S1405). If the position identification section 106 determines that the correlation value is not calculated for all positions (NO at step S1405), the position identification section 106 returns to step S1403 and again acquires the unique information provided by totalizing the unique information of all sensors associated with a different position for which correlation value calculation is not yet performed from the position-unique information database.

Figure 16:
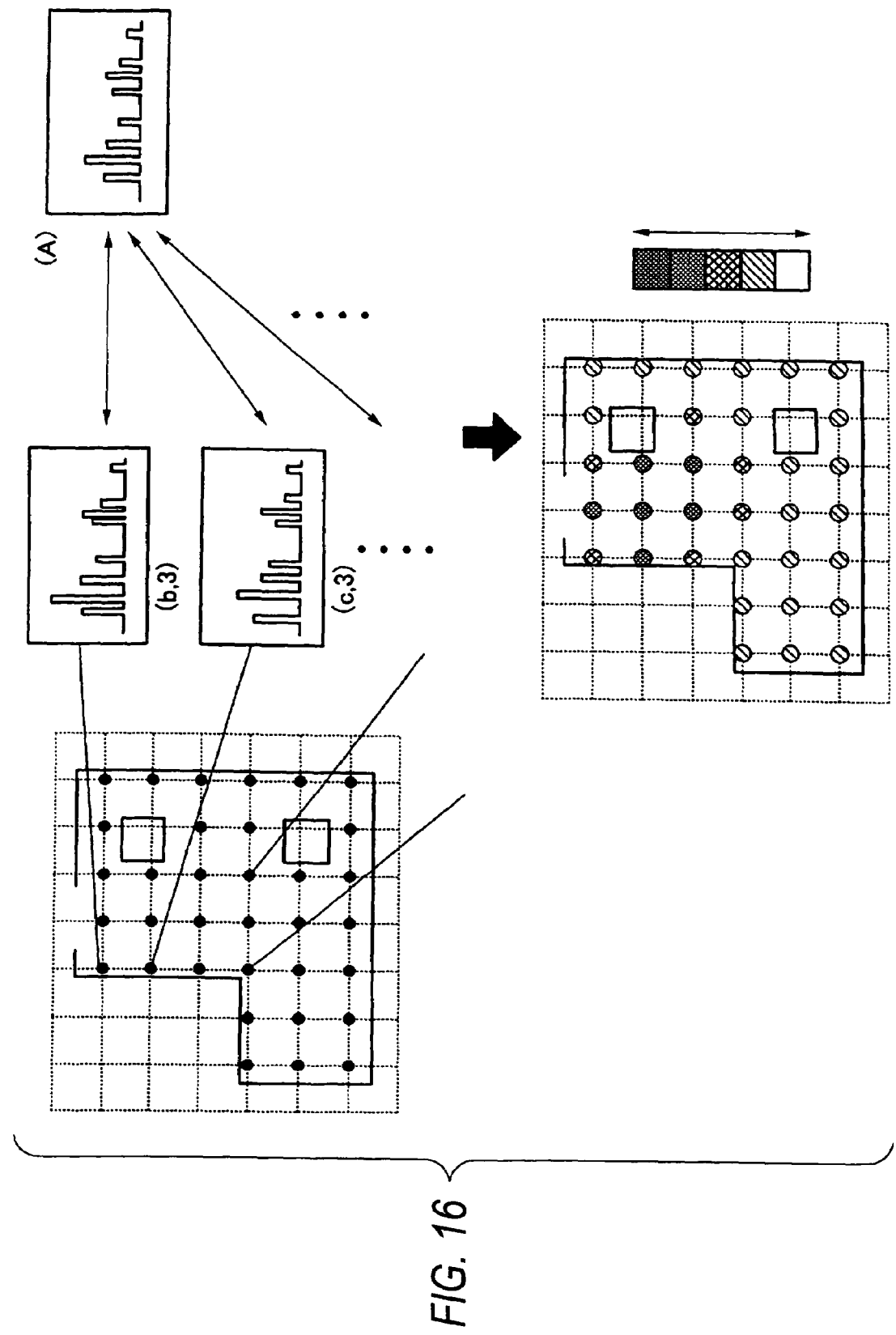
FIG. 16 is a conceptual drawing to show lattice points indicating positions on a room drawing and calculated correlation values with the mobile robot of the embodiment of the position identification apparatus.

The correlation value is calculated for all positions retained in the position-unique information database according to the procedure described above. FIG. 16 is a conceptual drawing wherein a comparison is made between the signal unique information acquired from the unique information generation section 105 and the unique information retained in the position-unique information database and the correlation value for each position is calculated. In the figure, (A) indicates the signal unique information acquired from the unique information generation section 105, the correlation value for each position is calculated using the signal unique information and the unique information for each position retained in the position-unique information database, the correlation value calculation result of all positions is shown below the arrow, and the higher the correlation at each position on the room drawing, the darker represented the color. In the embodiment, the correlation value is calculated for all positions, but the invention is not limited to the mode. For example, if the mobile robot 100 recognizes the current position by position identification, the correlation value between the signal unique information and the unique information at the position is calculated for determining the self-position and if the correlation value is not higher than a threshold value, the correlation value may be calculated for all positions.

Referring again to FIG. 15, if the position identification section 106 determines that the correlation value has been calculated for all positions (YES at step S1405), the position identification section 106 complements the space between the lattice points indicating the positions using a proper function from the correlation value for each position, thereby generating a mountain-like distribution of the correlation values concerning the whole field plane indicating the room (step S1406).

Figure 17:
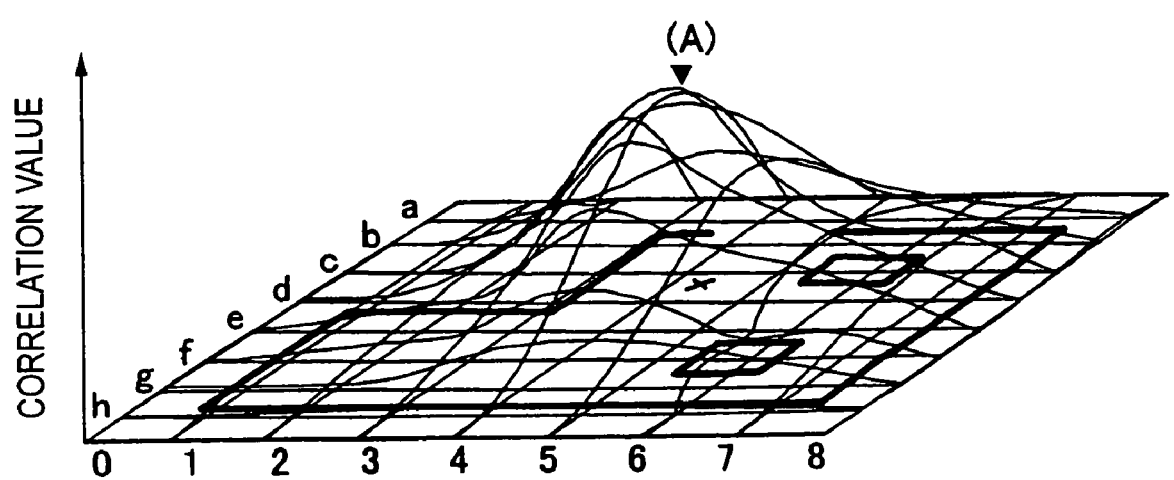
FIG. 17 is a drawing to show a mountain-like distribution of the correlation values at positions in the whole field plane indicating a room in the embodiment of the position identification apparatus.

FIG. 17 shows the generated mountain-like distribution of the correlation values. The position indicating the crest of the mountain-like distribution (A) on the field plane becomes the most possible position of the current position of the mobile robot 100.

Referring again to FIG. 15, whether or not the correlation value of the crest of the mountain-like distribution of the correlation values is higher than a predetermined threshold value is determined (step S1407). If the correlation value of the crest is determined higher than the threshold value (YES at step S1407), the position indicating the crest of the mountain-like distribution on the field plane is identified as the current position (step S1409). The threshold value refers to a predetermined correlation value used as the reference for identifying the current position. If the correlation value is higher than the threshold value, it can be estimated that the position associated with the correlation value is the current position. The actual threshold value is determined based on the measurement result.

If the correlation value of the crest is determined lower than the threshold value (NO at step S1407), it is determined that anyone or more sensors are comparison targets (step S1408) and the process returns to step S1402 and the signal unique information provided by totalizing the signal unique information of any determined sensors is acquired from the unique information generation section 105.

For example, if the sensors are the eight sensors shown in FIG. 9, the "anyone or more sensors" are the sensors assigned odd numbers. Thus, the position identification section 106 calculates the correlation value based on the signal unique information and the unique information in four directions having the relation of phase difference 90 degrees. In this case, to calculate the correlation value at step S1404, the position identification section 106 needs not only to calculate the correlation value from the signal unique information provided by totalizing the signal unique information of the sensors assigned the odd numbers acquired from the unique information generation section 105 and the unique information provided by totalizing the unique information of the sensors of the odd numbers in the position-unique information database, but also to calculate the correlation value with the unique information provided by totalizing the unique information of the sensors of even numbers in the position-unique information database. A mountain-like distribution of the former correlation values and that of the latter correlation values are generated and the higher crest is assumed to be the most possible position of the current position. If the current position cannot be identified because the correlation value is lower than the threshold value in comparison using the sensors assigned the odd numbers, it is determined that the sensors assigned the even numbers are comparison targets (step S1408) and the process returns to step S1402 and the signal unique information provided by totalizing the signal unique information of any determined sensors is acquired from the unique information generation section 105. As the comparison targets for comparison with the unique information are thus narrowed to any one or more sensors, ultrasonic measurement in any desired direction can be avoided for identifying the current position. Thus, if an exceptional obstacle, such as a human being or an animal, exists in the vicinity of the mobile robot 100, it is made possible to avoid the direction of the obstacle for identifying the self-position.

In the embodiment, first the current position is identified with all sensors as the position identification processing, but the invention is not limited to the mode. After the sensors to be used for identification are narrowed from the beginning, the correlation value with the unique information may be calculated based on the signal unique information provided by totalizing the signal unique information of the sensors. Further, the value of the crest of the mountain-like distribution of the correlation values is compared with the threshold value and only if the value exceeds the threshold value, the position of the crest is identified as the current position, but the position of the crest may be identified intact as the current position without providing the threshold value.

Further, the correlation value may be calculated based on the signal unique information provided by totalizing the signal unique information of all sensors, whereby the operation processing is lightened and it is made possible to identify the current position at high speed.

The identification method of the current position is not limited to the identification of the current position based only on the correlation value calculation. The self-position may be identified together with detection of the move distance with any other sensor, in the embodiment, the move distance detection section 108 for detecting the move distance. For example, if there are two or more crests of a generated mountain-like distribution of the correlation values because of a structure problem of a room, the move distance is calculated by the move distance detection section 108 and is used to identify the current position, whereby it is made possible to identify any mountain crest as the current position of the mobile robot 100 and it is made possible to identify the current position more accurately.

Figure 18:
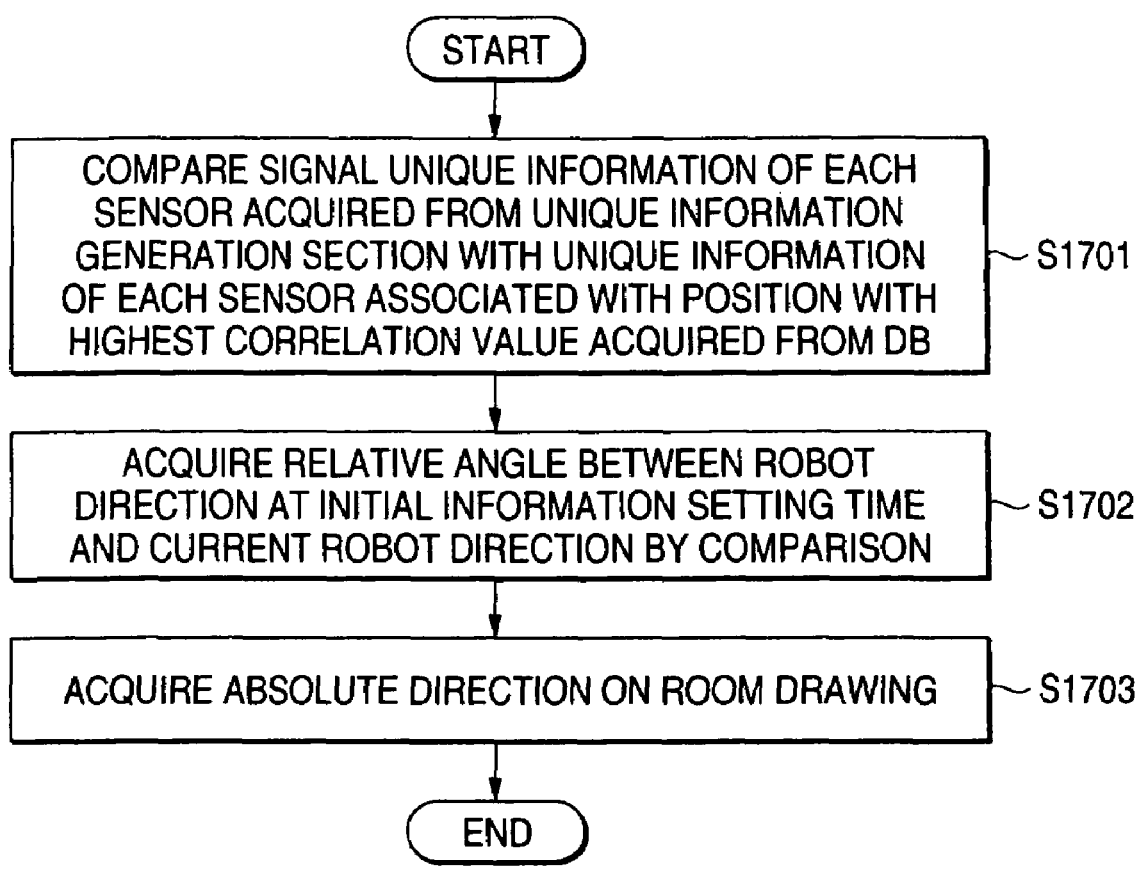
FIG. 18 is a flowchart to show a processing procedure of identifying the direction of the mobile robot of the embodiment of the position identification apparatus.

In the embodiment, if the current position of the mobile robot 100 is identified, further it is also made possible for the position identification section 106 to identify the azimuth of the mobile robot 100. FIG. 18 shows a processing procedure until determination of the azimuth of the mobile robot 100.

After identifying the current position of the mobile robot 100, the position identification section 106 compares the signal unique information of each sensor acquired from the unique information generation section 105 with the unique information of each sensor associated with the position with the highest correlation value acquired from the position-unique information database (step S1701). For example, the position identification section 106 compares the signal unique information of the first sensor in FIG. 9 acquired from the unique information generation section 105 with the unique information of each sensor in the position-unique information database to find the sensor with the highest correlation value.

The position identification section 106 acquires the relative angle between the first sensor and the sensor with the highest correlation value (step S1702) and identifies the absolute azimuth of the mobile robot 100 from the relative angle and the initial direction previously stored in the position-unique information database, namely, the initial direction of the mobile robot 100 at the initial information setting time for generating unique information (step S1703).

Accordingly, it is made possible for the mobile robot 100 to identify the absolute azimuth without including an azimuth detection unit. In the embodiment, the first sensor is used as the comparison target, but the number of the comparison target sensor is not limited.

Figure 19:
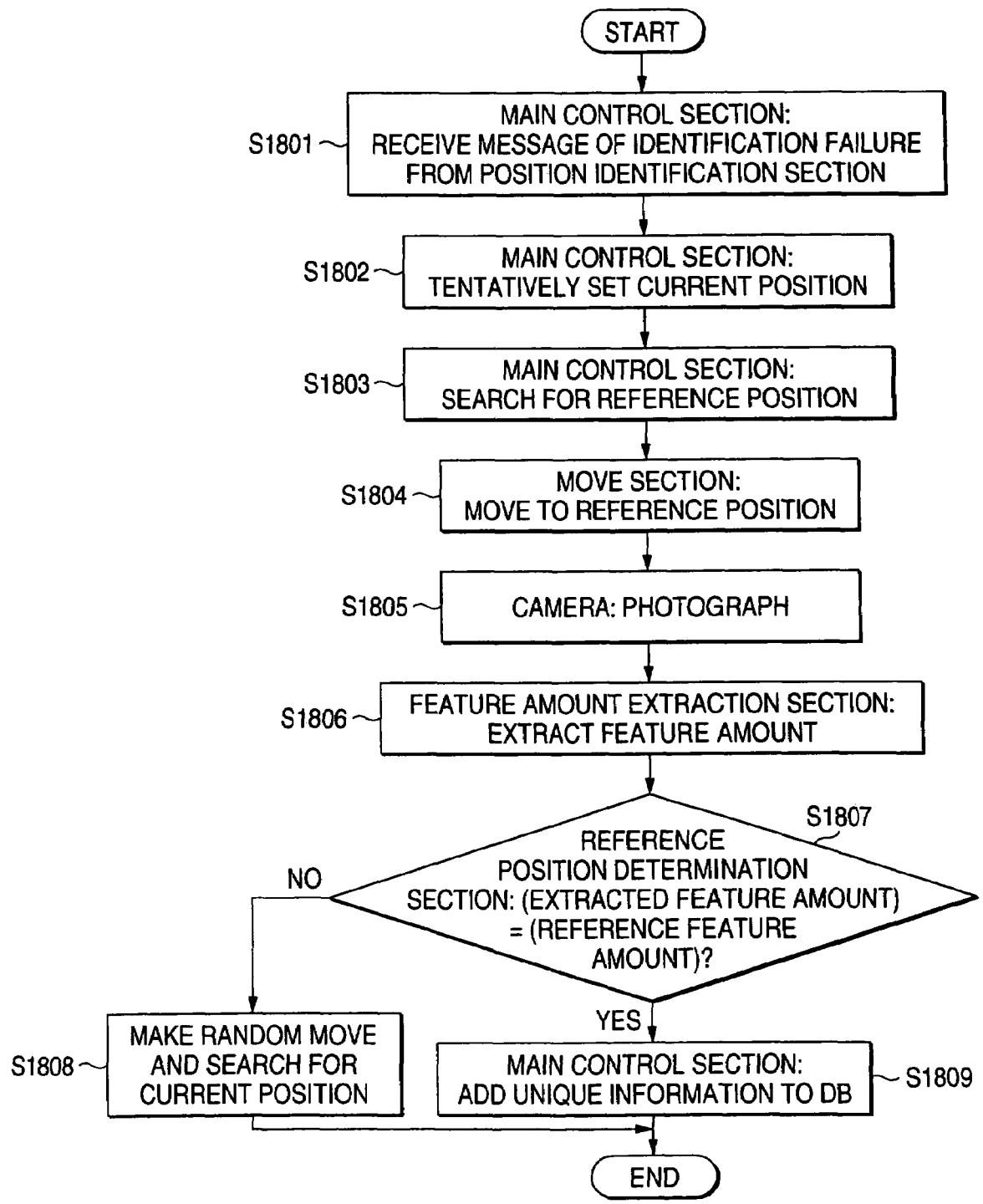
FIG. 19 is a flowchart to show a processing procedure until identification of the current position if the mobile robot of the embodiment of the position identification apparatus fails to identify the current position.

If any sensor is used as a comparison target in the position identification processing procedure, the current position may be unable to be identified because the highest correlation value does not exceed the threshold value or for any other reason. Processing until identification of the current position of the mobile robot 100 will be discussed. FIG. 19 is a flowchart to show a processing procedure until identification of the current position if the mobile robot fails to identify the current position in the position identification processing procedure shown in FIG. 14 according to the embodiment.

First, a message of identification failure of the current position is input from the position identification section 106 to the main control section 107 (step S1801). For example, the possible case is as follows: Since a room door is closed abruptly, the acquired signal unique information becomes different from the unique information retained in the position-unique information database and it is made impossible to obtain a reliable correlation value at any positions.

Next, the main control section 107 sets the position found from the current position stored in the storage section 110 and the move distance detected by the move distance detection section 108 as a tentative current position (step S1802). The mobile robot 100 searches for the reference position existing in the vicinity of the current position from the position feature information stored in the storage section 110 (step S1803). The mobile robot 100 moves to the found reference position by the move section 109 (step S1804). After moving to the reference position, the mobile robot 100 takes an attitude similar to that at the generation time and photographs the surrounding environment by the camera 111 (step S1805). The feature amount extraction section 112 extracts the feature amount from the photographed image data (step S1806). The reference position determination section 113 makes a comparison between the extracted feature amount and the reference feature amount retained as the position feature information (step S1807). If the extracted feature amount and the reference feature amount equal (YES at step S1807), it is determined that the tentatively set current position is correct. The mobile robot 100 moves to the position of the lattice point in the position-unique information database nearest to the current position tentatively set at step S1802 and under the control of the main control section 107, collects the signal unique information at the position and adds the collected signal unique information to the position-unique information database as the unique information in association with the lattice point indicating the position aside from the already held unique information (step S1809). If the extracted feature amount and the reference feature amount do not equal (NO at step S1807), the main control section 107 determines that the current position is lost. The mobile robot 100 makes a random move in the move field by the move section 109 and then searches for the current position until the correlation value of the current position exceeds the threshold value according to the current position identification procedure described with reference to FIG. 15 (step S1808).

Such a processing procedure is executed, whereby if identification of the current position ends in failure, it is made possible to acquire information of the current position.

Different pieces of unique information are retained in the position-unique information database in association with the same position, whereby if ultrasonic wave reflection information at the same point largely changes as a door or a window is opened, for example, depending on the room structure, it is made possible to identify the current position. The procedure for identifying the current position based on different pieces of unique information is as follows: The correlation value is calculated for each of the different pieces of unique information corresponding to the position at step S1404 shown in FIG. 15, and the highest correlation value of the calculated correlation values is adopted as the current correlation value and is used to generate a mountain-like distribution function of the correlation values for identifying the current position of the mobile robot 100.

In the embodiment, when the current position of the mobile robot 100 is identified, if the current position is identified as the position indicating a lattice point in the position-unique information database, the unique information in the position-unique information database is updated in association with the current position in response to the environment change; if it is confirmed that the position is the current position based on the reference position information although identification of the current position ends in failure in the processing procedure described with reference to FIG. 15, unique information is newly added to the position-unique information database in association with the coordinates of the lattice point indicating the position. However, the invention is not limited to the mode. For example, even if it is confirmed that the position is the current position based on the reference position information although identification of the current position ends in failure, the unique information in the position-unique information database may be updated in association with the coordinates of the lattice point indicating the current position.

The position identification procedure in the embodiment is to compare the acquired signal unique information with the unique information associated with the position previously retained for identifying the position. In an often used method of using the arrival time of the primary reflected wave of an ultrasonic wave, etc., a secondary or tertiary reflected wave of an ultrasonic wave, etc., transmitted from a different sensor enters another sensor earlier than the primary reflected wave in the direction in an environment wherein an obstacle is of a complicated shape or if an object absorbing or dispersing an ultrasonic wave, etc., exists in the move field, the reflected wave cannot be received and therefore accurate position measurement of an obstacle cannot be conducted. In the position identification procedure in the embodiment however, disturbance noise is also handled as unique information at the position, so that it is made possible to accurately identify the current position even in a complicated environment.

Since the mobile robot 100 does not require installation of a mark, an external auxiliary signal, it is made possible to accurately identify the current position even in an environment wherein such a mark cannot be installed. Further, it is not necessary to change the sensor to be used in response to the environment and it is made possible to identify the current position only with an ultrasonic sensor.

In the embodiment, an ultrasonic wave acquires the signal unique information; the ultrasonic wave originating time is used as the reference time and the signal strength of the reflected wave changing with the elapsed time since the reference time is used as the signal unique information and the unique information for identifying the position, so that it is made possible to identify the current position at high speed with light load imposed on a computer without performing large data processing.

In the embodiment, the mobile robot 100 is adopted as the position identification apparatus of the invention, but the invention is not limited to the mobile robot. The invention is not limited either to identification of the current position after the mobile robot 100 moves; the current position can also be identified after the user, etc., changes the installation location, etc.

(Modifications)

The invention is not limited to the specific embodiment described above and the following various illustrated modifications can be made:

(Modification 1)

Figure 20:
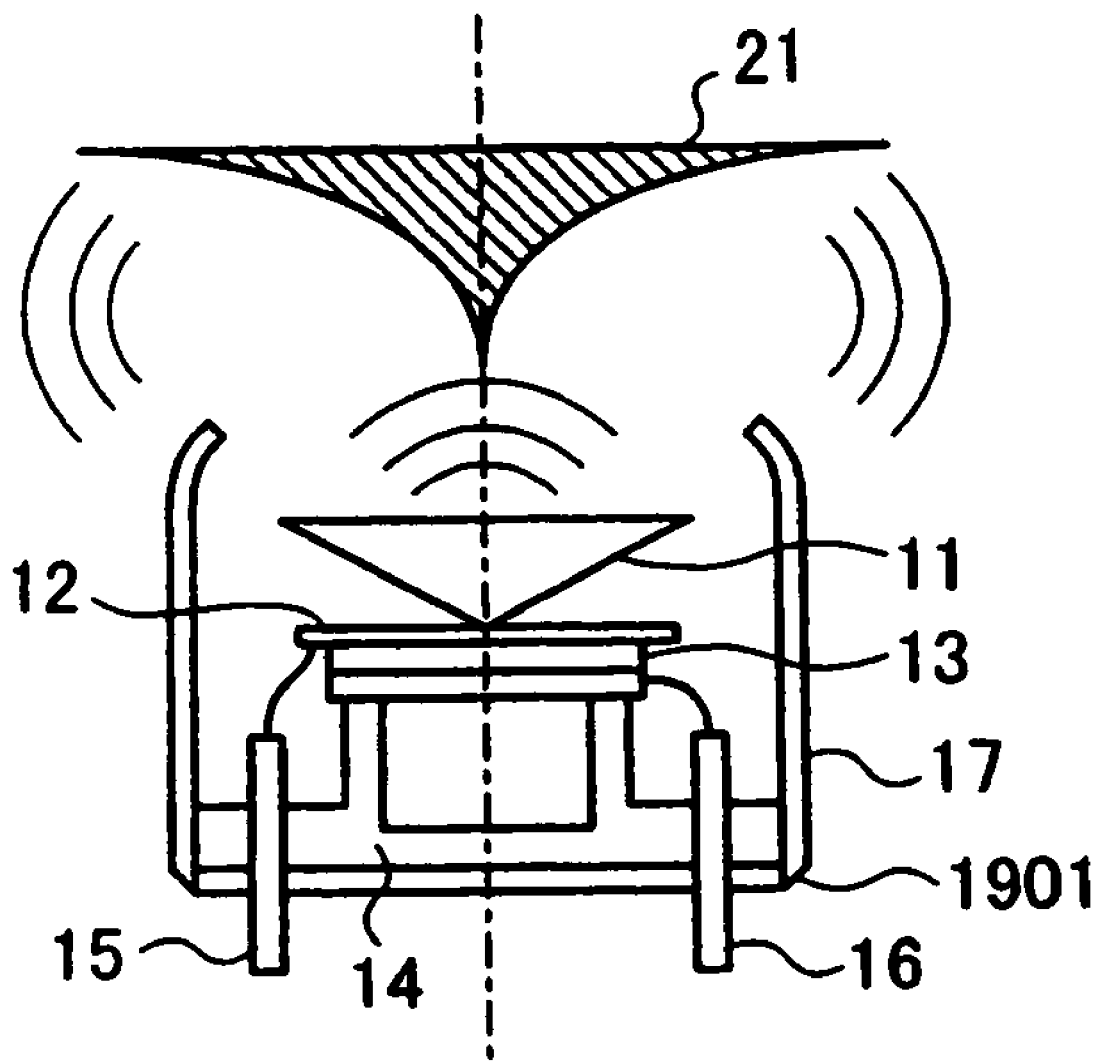
FIG. 20 is a drawing to show an example wherein a reflecting plate is installed ahead of an ultrasonic sensor to transmit and receive an ultrasonic wave in all directions relative to the move plane as the embodiment of the position identification apparatus.

In the embodiment described above, the directional ultrasonic sensors 101 transmit and receive an ultrasonic wave at every arbitrary angle, but the installation of the ultrasonic sensors 101 is not limited to the mode. For example, as shown in FIG. 20, ultrasonic sensor 101 is installed so that an ultrasonic wave transmitted from a cone-type resonator 11 of one ultrasonic sensor 101 is omni directionally uniformly dispersed radially using a reflecting plate 21 and the reflected wave returned from the radiation direction can also be received at the one ultrasonic sensor 101 through the reflecting plate 21, so that it is made possible to transmit or receive an ultrasonic wave from or at the ultrasonic sensor 101 in parallel with the robot move plane 202 and in the radiation direction. The reflecting plate 21 forms a reflection device in the embodiment of the invention. If signal unique information is acquired based on the received reflected wave and is retained in the position-unique information database in association with the position as unique information, it is made possible to identify the current position at low cost and at high speed. Since only one ultrasonic sensor 101 is included, it is impossible to identify the direction based on the relative angle between the sensor receiving the reflected wave and the sensor in the position-unique information database. If such a reflection structure is included, the robot 100 needs to contain an azimuth detection section using the earth's magnetism, for example.

(Modification 2)

In the embodiment described above, the unique information is only the signal strength of the reflected wave changing with the elapsed time since the reference time at which an ultrasonic wave was transmitted, but the type of unique information retained in the position-unique information database in association with the position is not limited to one type, and different types of unique information can be retained in association with the position. In the modification, a frequency distribution provided by conducting frequency analysis on the received reflected wave using FFT, etc., is retained in the position-unique information database as unique information in association with the position in addition to the signal strength of the reflected wave changing with the elapsed time since the reference time at which an ultrasonic wave was transmitted, associated with the position. When the current position is identified, the correlation value is found based on the received reflected wave and thus in addition to the signal strength of the received reflected wave, frequency analysis is conducted on the reflected wave to find a frequency distribution as unique information, and the correlation values are found based on the unique information retained in the position-unique information database. The two types of correlation values for each position are added together, a mountain-like distribution is generated according to the sum of the correlation values, and the crest is identified as the current position, so that it is made possible to identify the current position based on the two different types of unique information and it is made possible to enhance the identification accuracy.

(Modification 3)

In the embodiment described above, the mobile robot has the function of inputting map information from CAD data, design drawings, etc. For example, the mobile robot 100 includes a unit having any or some of sensors such as a displacement sensor such as an encoder, a distance sensor such as an ultrasonic senor, and an image sensor such as an optical camera, it is made possible to generate a room drawing by searching while sensing if the mobile robot is installed on an unknown field plane. When the room drawing is generated, unique information may be collected. Accordingly, it is made possible to collect unique information efficiently and the need for the user to input a room drawing to the mobile robot can be eliminated.

As described above, the current position identification apparatus and the current position identification method according to the invention are useful for identifying the current position and are suited particularly for a mobile robot intended for identifying the current position by transmitting and receiving a signal.

What is claimed is:

1. A self-position identification apparatus comprising:
   (a) a storage device storing position association unique information associating position coordinates and unique information indicating a unique feature amount associated with the position coordinates;
   (b) a transmission device transmitting a detection signal assigned identification information;
   (c) a reception device receiving a reflection signal corresponding to the detection signal transmitted by said transmission device;
   (d) a generation device generating signal unique information based on a unique position from the reflection signal received by said reception device; and
   (e) an identification device comparing between the signal unique information generated by said generation device and the unique information associated with the position coordinates included in the position association unique information and indentifying a current position,
   wherein:
   (f) said identification device compares between the signal unique information generated by said generation device and the unique information included in the position association unique information stored in said storage device;
   (g) the identification device calculates the correlation value indicating the correlation between the position coordinates associated with the unique information and the current position;
   (h) the identification identifies the current position based on the calculated correlation value:
   (i) said identification device complements a correlation value at a position different from the position coordinates from the calculated correlation value;
   (j) the identification device calculates a distribution of the correlation values corresponding to the position coordinates; and
   (k) the identification device identifies the crest of the distribution of the correlation values as the current position.

2. The self-position identification apparatus according to claim 1, wherein said identification device compares between the signal unique information generated by said generation device and the unique information associated with the position coordinates included in the position association unique information, and
   wherein the unique information contained in the signal is closest to the unique information associated with the position.

3. The self-position identification apparatus according to claim 1, further comprising:
   a filtering device removing noise from the reflection signal received by said reception device.

4. The self-position identification apparatus according to claim 3 wherein the filtering device removes noise from the reflection signal based on a reference time predetermined for an elapsed time from transmission of the detection signal by said transmission device to reception of the reflection signal by the reception device.

5. The self-position identification apparatus according to claim 4 wherein the filtering device removes noise from the reflection signal based on a plurality of reference times.

6. The self-position identification apparatus according to claim 1, wherein said transmission device includes a plurality of transmission sections annularly disposed each transmission section transmitting the detection signal having directivity and wherein
   said reception device includes a plurality of reception sections annually disposed each reception section receiving the reflection signals corresponding to the detection signals transmitted from the transmission sections.

7. The self-position identification apparatus according to claim 1, wherein said transmission device includes a transmission section rotating on an axis,
   wherein the transmission device transmits the detection signal having directivity at every arbitrary angle,
   wherein said reception device includes a reception section rotating on the axis, and
   wherein the reception device receives the reflection signal corresponding to the detection signal transmitted from said transmission section.

8. The self-position identification apparatus according to claim 1, further comprising:
   a reflection device radially reflecting the detection signal transmitted from a direction and reflecting the reflection signal in the direction, wherein the detection signal transmitted from said transmission device is transmitted radially through the reflection device, and
   wherein said reception device receives the reflection signal through the reflection device.

9. The self-position identification apparatus according to claim 6, wherein said storage device stores the unique information in association for each angle information indicating an angle between the reception direction receiving the reflection signal in the position coordinates and a previously stored initial direction as the position association unique information,
   wherein said generation device generates signal unique information associated with angle information calculated from the reception direction receiving the reflection signal by the reception section and a reference direction of the reception section,
   wherein said self-position identification apparatus further includes a device,
   wherein the device compares between the signal unique information generated by said generation device and the unique information included in the position association unique information, and
   wherein the device calculates a relative angle between the initial direction and the reference direction on the basis of angle information associated with the unique information closest to the generated signal unique information.

10. The self-position identification apparatus according to claim 1 wherein said storage device stores the position coordinates and the signal unique information generated by said generation device, associated with the position coordinates in association as the position association unique information.

11. The self-position identification apparatus according to claim 1, further comprising:
    a removal device removing the reflection signal based on identification information of the reflection signal received by said reception device.

12. The self-position identification apparatus according to claim 11 wherein the identification information assigned to the detection signal is a signal with the transmission interval coded, and
    the identification information of the reflection signal is a signal with the reception interval coded.

13. The self-position identification apparatus according to claim 1 wherein said storage device stores reference position coordinates and feature information indicating the feature of the reference position coordinates in association with each other as reference position feature information, and
    wherein said self-position identification apparatus further includes:
    a detection device detecting environment information at the current position;
    an extraction device extracting current position feature information indicating the feature of the current position from the environment information detected by the a detection device; and
    a determination device comparing between the current position feature information extracted by the extraction device and the feature information included in the reference position feature information and determining whether or not the current position is the reference position.

14. The self-position identification apparatus according to claim 1, further comprising:
    an update device updating the current position identified by said identification device and the signal unique information generated by said generation device in association with each other in the position association unique information stored in said storage device.

15. A self-position identification method comprising:
    (a) storing with a storage device position association unique information provided by associating position coordinates and unique information indicating a unique feature amount associated with the position coordinates;
    (b) transmitting a detection signal assigned identification information;
    (c) receiving a reflection signal corresponding to the transmitted detection signal;
    (d) generating with a generation device signal unique information based on a unique position from the received reflection signal;
    (e) comparing with an identification device between the generated signal unique information and the unique information associated with the position coordinates included in the position association unique information;

(f) identifying a current position;
(g) comparing the signal unique information generated by said generation device and the unique information included in the position association unique information stored in said storage device, and
(h) calculating the correlation value indicating the correlation between the position coordinates associated with the unique information and the current position; and wherein:
(i) said identification device complements a correlation value at a position different from the position coordinates from the calculated correlation value;
(j) the identification device calculates a distribution of the correlation values corresponding to the position coordinates, and
(k) the identification device identifies the crest of the distribution of the correlation values as the current position.

16. The self-position identification method according to claim 15 wherein, when the current position is identified, the position coordinates associated with the unique information closest to the signal unique information among the pieces of the unique information included in the position association unique information is identified as the current position, while the signal unique information generated at said generation step and the unique information associated with the position coordinates included in the position association unique information are compared.

17. The self-position identification apparatus according to claim 6, wherein each transmission section simultaneously transmits the detection signal having directivity.

* * * * *